United States Patent
Rivaud et al.

(10) Patent No.: US 12,392,958 B2
(45) Date of Patent: Aug. 19, 2025

(54) IMAGING LANTERN FOR ENHANCED OPTICAL TRANSMISSION

(71) Applicant: Ciena Corporation, Hanover, MD (US)

(72) Inventors: Daniel Rivaud, Ottawa (CA); Michael Y. Frankel, Pikesville, MD (US); Vladimir Pelekhaty, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 344 days.

(21) Appl. No.: 18/096,435

(22) Filed: Jan. 12, 2023

(65) Prior Publication Data

US 2024/0241307 A1 Jul. 18, 2024

(51) Int. Cl.
*G02B 6/06* (2006.01)
(52) U.S. Cl.
CPC ....................... *G02B 6/06* (2013.01)
(58) Field of Classification Search
CPC ............... G02B 6/04; G02B 6/06; G02B 6/40
See application file for complete search history.

(56) References Cited

U.S. PATENT DOCUMENTS

| | | | | |
|---|---|---|---|---|
| 2005/0031277 A1* | 2/2005 | Japon | ............ | G02B 6/443 385/109 |
| 2020/0083659 A1 | 3/2020 | Reeves-Hall et al. | | |
| 2021/0080664 A1 | 3/2021 | Pezeshki et al. | | |
| 2021/0273397 A1* | 9/2021 | Gorju | ............ | H01S 3/0057 |

FOREIGN PATENT DOCUMENTS

| CN | 112946820 A | * | 6/2021 | ............ G02B 6/26 |
|---|---|---|---|---|
| CN | 114 690 321 A | | 7/2022 | |

OTHER PUBLICATIONS

Translation of CN-112946820-A (Year: 2021).*
D. Apostolopoulos et al., Photonic integration enabling new multiplexing concepts in optical board-to-board and rack-to-rack interconnects, Proceedings of Spie, IEEE, US, vol. 8991, March 8. 2014, pp. 1-15.
Dec. 22, 2022, International Search Report and Written Opinion for International Patent Application No. PCT/US2022/042034.
T. A. Birks et al., "The photonic lantern," Advances in Optics and Photonics, vol. 7, No. 2, Apr. 13, 2015, pp. 107-167.
RuiYu Li et al., "An Investigation on Spatial Dimension Multiplexing/Demultiplexing for SDM Systems," 2022 IEEE the 8th International Conference on Computer and Communications (ICCC), Dec. 9, 2022, pp. 1566-1572.
Anonymous, "Le Verre Fluoré Fiber Solutions," URL: https://web.archive.org/web/20221202083955/https://leverrefluore.com/product/passive-fibers/, Dec. 2, 2022, 7 pages.
May 6, 2024, International Search Report and Written Opinion for International Patent Application No. PCT/US2024/011137.

* cited by examiner

*Primary Examiner* — Chad H Smith
(74) *Attorney, Agent, or Firm* — Baratta Law PLLC; Lawrence A. Baratta, Jr.

(57) ABSTRACT

An imaging fiber bundle includes a first end and a second end; and N photonic lanterns, N>1, wherein the N photonic lanterns are disposed between and aligned to the first end and the second end. Each of the N photonic lanterns includes first M multimode cores, at the first end, that extend to S single-mode cores, where M and S are integers, and M<S, and second M multimode cores that, at the second end, that extend from the S single-mode cores.

19 Claims, 27 Drawing Sheets

IMAGING LANTERN FOR ENHANCED OPTICAL TRANSMISSION

FIELD OF THE DISCLOSURE

The present disclosure generally relates to computing hardware. More particularly, the present disclosure relates to systems and methods for an imaging lantern to provide enhanced optical transmission.

BACKGROUND OF THE DISCLOSURE

Traditionally, in the context of networking equipment and devices utilizing fiber transmission, Light Emitting Diodes (LEDs) are coupled to multimode fiber. This is because LEDs are multimode sources with a high numerical aperture. In various networking architectures, there is a need to interconnect adjacent equipment, such as within 10 m, in addition to equipment at greater distances. The use of multimode fiber limits the usability of such technology because of the limited reach associated with multimodal fibers due to modal dispersion. Alternatively, if an LED is coupled directly to a single mode fiber, most of the LED power is rejected at the interface, so reach is limited by power. The present disclosure addresses such power loss and reachability challenges by providing systems and methods for an imaging lantern to provide enhanced optical transmission.

BRIEF SUMMARY OF THE DISCLOSURE

In an embodiment, an imaging fiber bundle includes a first end and a second end; and N photonic lanterns, N>1, wherein the N photonic lanterns are disposed between and aligned to the first end and the second end. Each of the N photonic lanterns includes first M multimode cores, at the first end, that extend to S single-mode cores, where M and S are integers, and M<S, and second M multimode cores that, at the second end, that extend from the S single-mode cores. The imaging fiber bundle can further include cladding, wherein larger cladding is utilized between single-mode cores of adjacent lantern groups than between single-mode cores within a single lantern group. The first end can be adapted to receive signals from an array of Micro Light Emitting Diodes (μLEDs), and wherein the second end can be adapted to transmit signals to one or more photodetectors. A total number of modes excited at the first end is not exceeding the total number of single-mode cores in the N photonic lanterns. The N photonic lanterns can include one of Zirconium Fluoride (ZrF4) fibers, Indium Fluoride (InF3) fibers, and Silicone (Si) glass fibers. The N photonic lanterns can include few-mode cores. The imaging fiber bundle can have a length of 10 m or more.

In another embodiment, a fiber cable includes a first end having a plurality of multimode cores; a center portion being a plurality of photonic lanterns that extend from the plurality of multimode cores to a plurality of single-mode cores where the number of single-mode cores is greater than the number of multimode cores; and a second end having a plurality of multimode cores that extend from the single-mode cores. The first end and the second end can each be aligned to the plurality of photonic lanterns. The fiber cable can further include cladding, wherein larger cladding is utilized between single-mode cores of adjacent lantern groups than between single-mode cores within a single lantern group. The first end can be adapted to receive signals from an array of Micro Light Emitting Diodes (μLEDs), and wherein the second end can be adapted to transmit signals to one or more photodetectors. A total number of modes excited at the first end is not exceeding the total number of single-mode cores in the plurality of photonic lanterns. The plurality of photonic lanterns can include one of Zirconium Fluoride (ZrF4) fibers, Indium Fluoride (InF3) fibers, and Silicone (Si) glass fibers. The plurality of photonic lanterns can include few-mode cores. The fiber cable can have a length of 10 m or more.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
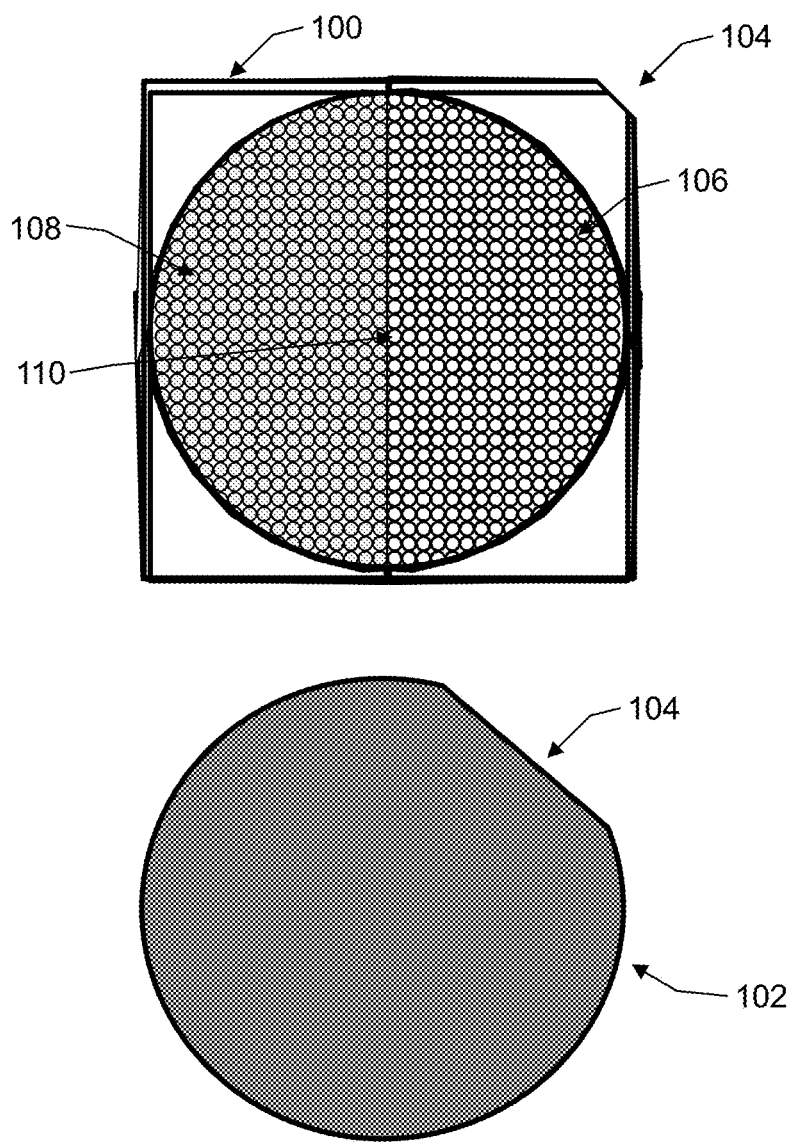
FIG. 1 is a diagram of the physical alignment features of a multicore fiber and chip.

In various embodiments, the present disclosure relates to systems and methods for providing an imaging lantern for μLED enhanced optical transmission based on multi-mode optical sources with large numerical aperture. Various embodiments of the imaging lantern include a first end having M multimode cores and a second end having S single-mode cores, wherein the M multimode cores and S single-mode cores form a plurality of lantern groups within the imaging lantern. The present imaging lantern is adapted to convert incoherent multimode light to single mode light in order to achieve higher coupled optical power and hence longer-distance transmission over multi-core imaging fiber. Micro-LED/PD arrangements & selection Physical alignment features between multicore fiber bundles and chips exists in the imaging industry and the present disclosure relies on this physical alignment but applied to a datacom application. FIG. 1 is a diagram of the physical alignment features of multicore fiber cables and chips, and describes how the industry achieves this alignment in the production of interconnect cables. In embodiments, the fiber bundle has a length of 10 m or less. FIG. 1 shows a chip (optical transceiver) 100 and fiber bundle 102. The chip 100 includes a physical alignment feature 104 disposed on a corner of the chip 100. The chip is coupled to a plurality of Light-Emitting Diodes (μLEDs) (also referred to as transmitters) 108 and Photodetectors (PDs) (also referred to as receivers) 106 arranged on the surface of the chip 100. The μLEDs 108 and PDs 106 are arranged in a half-circle arrangement which allows for the same type of chip to be used at both ends of the connection. The half-circle arrangement requires X and Y axis alignment, as well as angular alignment. The fiber bundle 102 also includes a physical alignment feature 104 which is common with imaging fibers. The multicore fiber bundle 102 and chip 100 shown in FIG. 1 require extra μLED 108 and PD 106 channels near the split line 110 and closer to the perimeter. Loose alignment tolerancing will require some way to selectively define PD 106 groups during manufacturing, as well as association of groups with specific μLED 108 data channels. This is proposed herein via electronic fuses or transmission gates.

It will be appreciated that the μLEDs 108 of the present disclosure may be any light emitting device such as micro-LEDs, Vertical Cavity Surface Emitting Lasers (VCSELs) or any other device known to one of skill in the art. Additionally, the photodetectors 106 of the present disclosure may be any light detecting device or device for converting photon energy of light into electrical signals known to one of skill in the art.

Even with physical alignment, there are alignment tolerances both in X and Y (Cartesian) and angular directions. The half-circle segmentation and associated PD selection circuitry are constructed to tolerate substantial misalignment, which reduces manufacturing costs.

Figure 2:
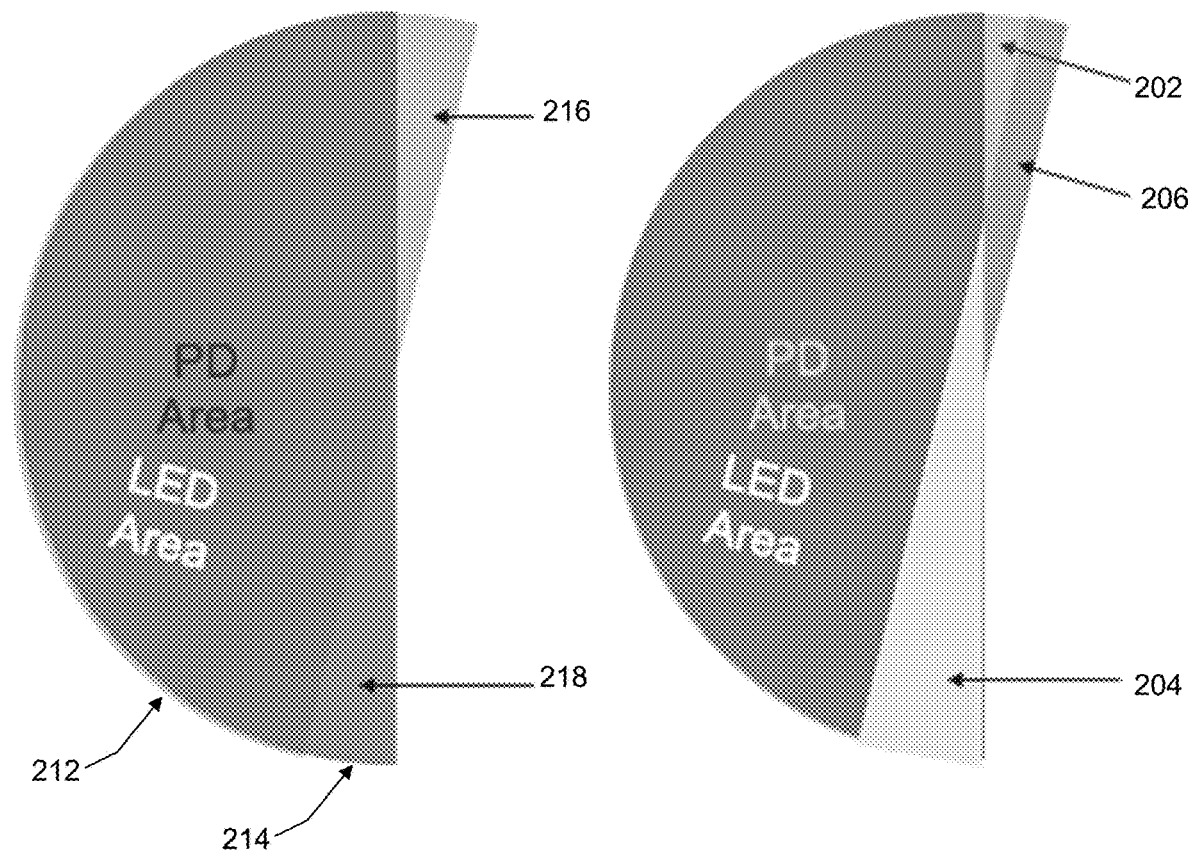
FIG. 2 is a diagram of possible angular misalignment between Micro Light Emitting Diode (μLED) and Photodetector (PD) half-circles.

Consider angular misalignment specifically, FIG. 2 illustrates how the present disclosure tolerates up to 9 degrees of angular misalignment with a reasonable number (about 5%) of excess μLEDs and PDs. A training pattern or procedure can identify which μLEDs need to be disabled. FIG. 2 illustrates possible angular misalignment between an μLED half-circle 212 and PD half-circle 214. The figure shows equal half-circles dedicated to an μLED to PD connection. In this case, angular misalignment leads to a sliver of wasted μLEDs 216 and a sliver of wasted PDs 218. There may be additional wasted PDs 218 along the μLED boundary due to near-end reflection crosstalk. The figure also shows a case where it is desired to save either more expensive or less reliable devices (i.e. μLED in this example). The disclosure provides a guard band 206 of unpopulated area on the μLED half-circle 212. This is constructed geometrically by creating a chord in the circle that does not pass through the center and thus results in unequal segments. This reduces the sliver of wasted μLEDs at the expense of increased sliver of wasted PDs. Additionally, various embodiments include a plurality of fiber cores used as guard bands in the fiber cable.

An Example of a μLED Budget can be as Follows

400 μLED data transmission
20 μLEDs clock transmission
20 μLEDs near half-moon split disabled due to angular misalignment
20 redundant μLEDs to accommodate lifetime μLED failures
460 μLEDs total Determining the number of μLEDs wasted when a guard band is not used is calculated as follows: 2 slivers (wasted μLEDs)*(9 degrees/360 degrees)*400 μLEDs=20 unusable μLEDs (5% of total μLEDs). This example demonstrates a misalignment of 9 degrees, but it will be appreciated that any misalignment is contemplated.

For all misalignments (X axis, Y axis, and angular), it is advantageous to selectively detect optimal PD groups and associate a group with a specific μLED channel. Accomplishing this starts by taking advantage of the fact that blue light has a short absorption length in silicon. That enables a low-capacitance PD which in turn enables high-gain in a first TIA (Trans-Impedance Amplifier) stage. This high-gain TIA gives the signal sufficient strength to drive up to 7 analog transmission gates and associated crosspoint stubs.

Complementary Metal-Oxide Semiconductor (CMOS) transmission line signal speed can be approximately 1.7E8 m/s, and a 10 Gbps signal with a 100 ps bit period corresponds to ~17 mm. The crosspoint switch is expected to be much smaller and can therefore be considered as a lumped element greatly simplifying overall design and assuring signal integrity without termination. The crosspoint switch can have series resistors (including through-gate resistance) with the first TIA and act as a voltage adder for up to 7 or more TIAs. Additionally, the signal chain can be implemented with an IA (Current Amplifier) and the switch can act as a current adder.

The embodiments disclosed herein may include hardware with different operating specifications. In various embodiments, the μLEDs are adapted to each transmit at least 1 Gb/s. Transmitter circuitry can be configured to receive an aggregate transmit signal to cause transmission of the aggregate signal as a plurality of lower rate transmit signals, each by one of the μLEDs (transmitters) over a portion of a first set of fiber cores. The Receiver circuitry can additionally be configured to receive a plurality of lower rate transmit signals from the PDs (receivers) and create an aggregate receive signal based thereon. In embodiments, the aggregate transmit, and the aggregate receive signal are at least 100 Gb/s.

Although the present disclosure has considered the crosspoint switch as a single large design, it might be necessary to segment it to control the crosstalk impact of parasitic capacitances on open transmission gates. This is done because overlap would be required in the segments to deal with desired tolerance to physical misalignments. For example, a group of PDs near the boundary between cross point segments would have the ability to drive both switch segments. The extra drive strength may be provided by an additional amplifier.

Figure 3:
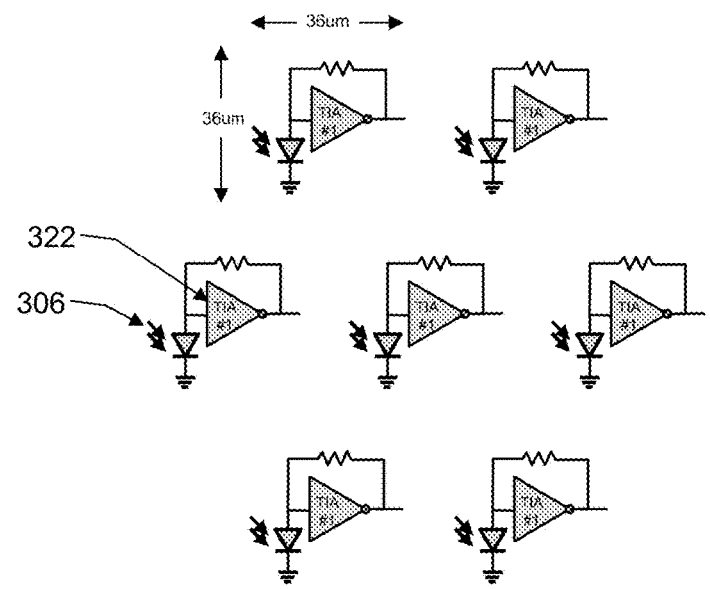
FIG. 3—FIG. 4 show a staged Trans-Impedance Amplifier (TIA) with intermediate analog crosspoint.
Figure 4:
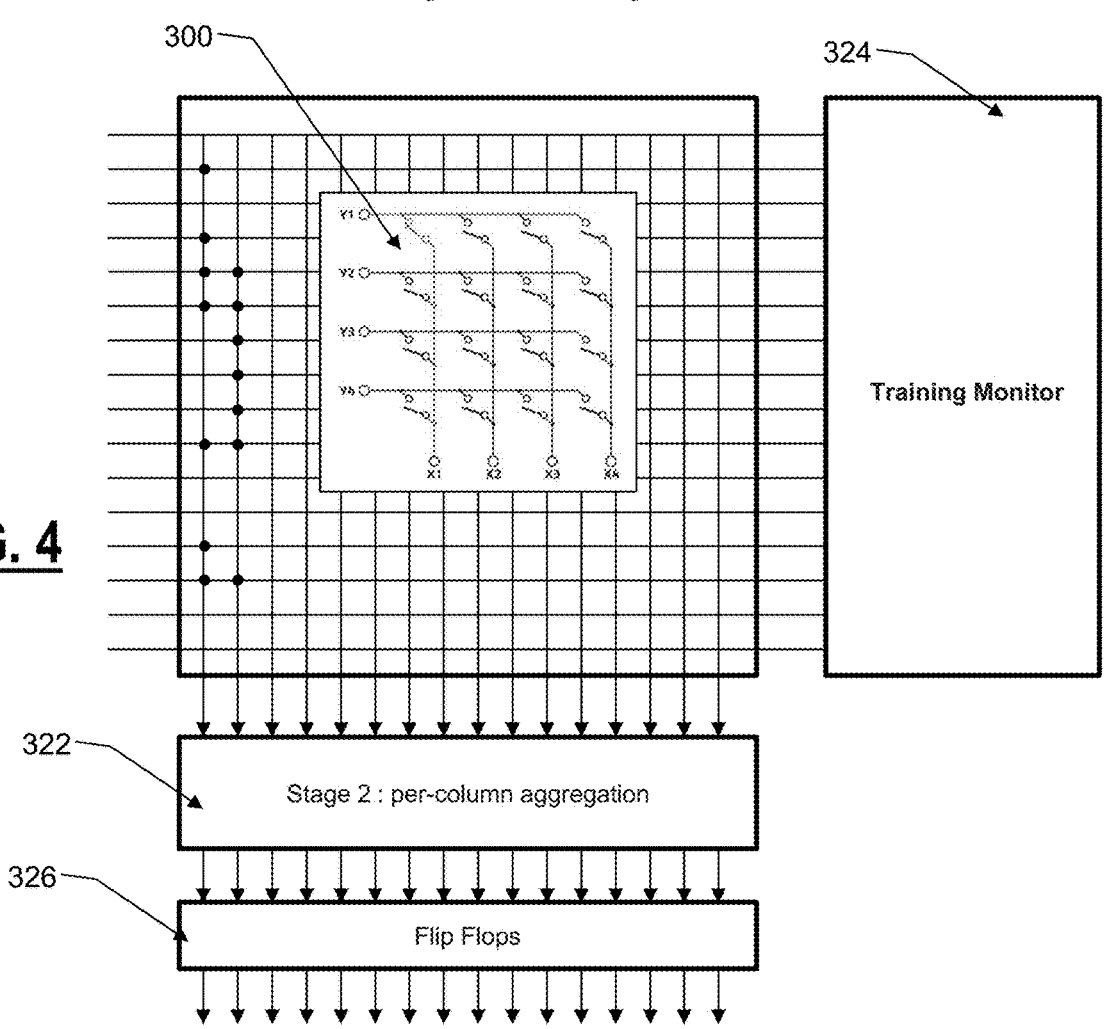

FIG. 3 and FIG. 4 show a TIA with intermediate analog crosspoint 300. In FIG. 3, each PD 306 is locally integrated with a stage 1 TIA 322. In the present example, 2800 PDs 306 are contemplated with 7 PDs 306 per µLED resulting in 400 µLEDs. It will be appreciated that other embodiments may have any number of PDs 306 with any number of µLEDs, and any number of PDs 306 per µLED. FIG. 4 shows the analog crosspoint switch with transmission gates (2800 inputs, 400 outputs), a training monitor 324, stage 2 signal aggregation 322 which may be either a voltage or a current adder, and flip-flop gate 326.

Figure 5:
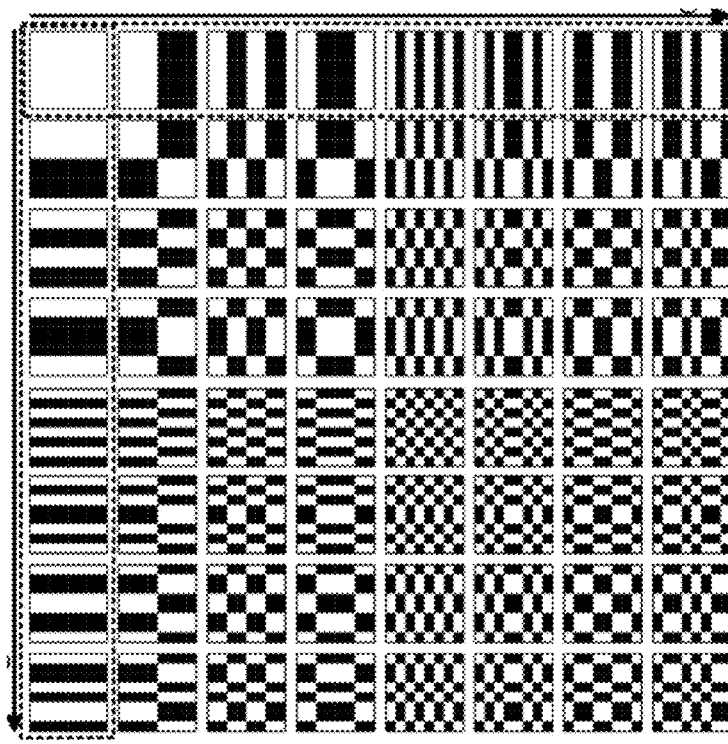
FIG. 5 is a diagram of training patterns used to light an array of μLEDs.

A training algorithm periodically recalibrates the PD groupings while in service, this accommodates µLED failure, aging, temperature, bending, XY axis tolerancing, angular tolerancing, and breakouts. The training can also be done only at manufacturing, which can accommodate breakouts and initial tolerancing. Training requires µLEDs to be turned on in separated groups and the resulting signal strength being measured by the PD array at the other end of the fiber. An efficient way of searching this space is by lighting up the µLED array using Hadamard patterns (64 such patterns shown in FIG. 5). This efficiency is important if done in-service to reduce overhead bandwidth, but also during manufacturing to reduce the cost of tuning time.

Figure 6:
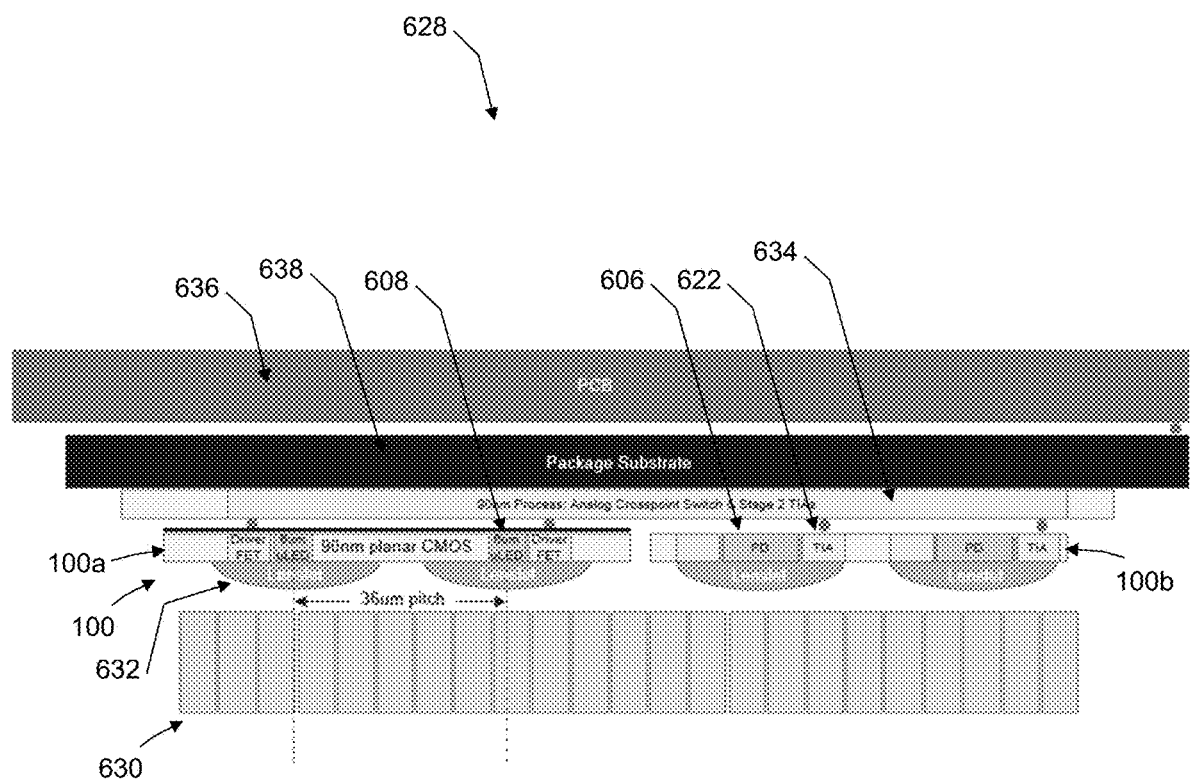
FIG. 6 is a diagram of an example 3D die stackup of a chip for receiving and transmitting via fiber cables.

FIG. 6 shows a cross section of an example 3D die stackup 628. The die stackup 628 includes a plurality of fiber cores 630, and a cross section of the chip 100 of FIG. 1, a PCB 636, and packaging substrate 638. Additionally, disposed on the chip 100 are a plurality of lenses 632 oriented over the plurality of µLEDs 608 and PDs 606. Again, in the present embodiment, the chip 100 includes separated sections 100a and 100b on which the µLEDs 608 and PDs 606 are disposed. In various embodiments, these separated sections are constructed as the half-circle sections disclosed herein, while other embodiments provide other shapes and configurations of the sections 100a and 100b on which the µLEDs 608 and PDs 606 are disposed. FIG. 6 shows how the PDs 606 and stage-1 TIAs 622 do not compete for area with the crosspoint switch 634. Although the present embodiment shows the first-stage TIA 622 competing for area with the PD 606 in a planar CMOS process, a TIA located under a back-illuminated PD on the same die is also contemplated so that it doesn't steal light-gathering capacity from the PD.

For the cable breakout configuration with a single fiber bundle, it is assumed that the same chip 100 is used at both ends for volume and cost reasons. It is also assumed that the cable is constructed from a group of fiber cores 630 with no particular orientation or alignment necessary between them. The training algorithm detects where the subset of fibers lands on each array, meaning that precise alignment is not necessary.

Figure 7:
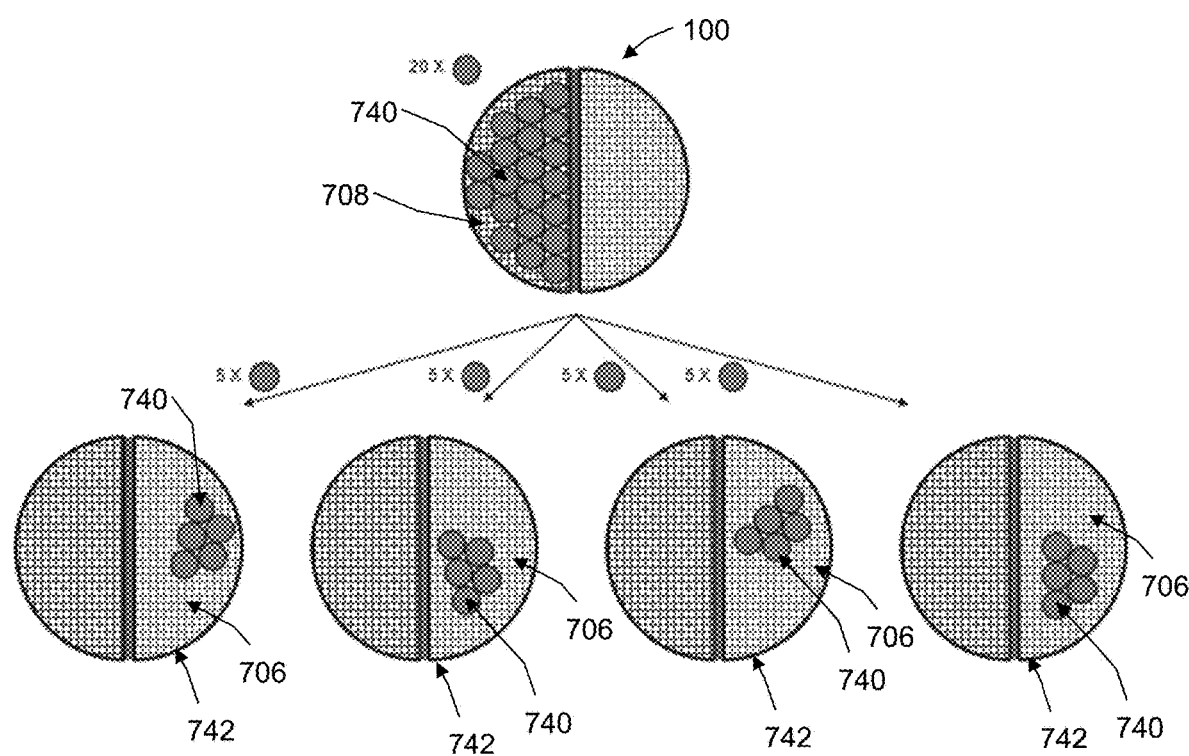
FIG. 7 is a diagram of multi core fibers aligned over an array without precision alignment.

FIG. 7 is a diagram of multi core cables aligned over an array (chip) without precise alignment. In the present embodiment shown in FIG. 7, 20 multi core cables 740 are aligned over the plurality of µLEDs 708 disposed on the chip 100 (transmitting chip) with 4 separate groups of 5 multi core cables 740 transmitting to 4 different receiving (RX) chips 742. More specifically, the groups of cables 740 are transmitting light from the µLEDs 708 of the first chip 100 to the PDs 706 of the receiving chips 742. It can be seen that orientation and precise alignment of the cables 740 at the receiving chips 742 is not required.

It will be appreciated that in other embodiments, any number of cables 740 and receiving chips 742 are contemplated, and the half-circle configuration of µLEDs 708 and PDs 706 can be configured in any way. The present embodiment shown in FIG. 7 shall be construed as a non-limiting example.

Additionally demonstrated in FIG. 7 is the use of one chip style for both the transmitting (TX) chip 100 and the plurality of receiving (RX) chips 742. This again reduces cost by only requiring a single type of chip for a connection. Other embodiments contemplated herein make use of different configurations and orientations of the µLED and PD sections disposed on a chip, some requiring different configurations for TX and RX locations.

In the present embodiment, it is assumed that up to 7 PDs are selected within the crosspoint switch to drive a single channel. This number of PDs collects nearly all of the light transmitted from an µLED, which reduces losses and increases reach. It should be noted that link performance is increased when composite Signal to Noise Ratio (SNR) is increased. It is assumed that electrical SNR due to the highest optical power $P_0$ PD as baseline $SNR_0 \sim P_0^2/N$, where N is TIA noise power. Then, adding an additional signal $P_1$ will produce summation of signal amplitudes and noise powers to give an SNR which is required to be larger than a baseline SNR.

$$SNR = \frac{(P_0 + P_1)^2}{2N} > \frac{(P_0)^2}{N}$$

This inequality is satisfied when additional signal amplitude is larger than a fraction of the baseline as:

$$P_1 > (\sqrt{2} - 1)P_0 \sim 0.41 P_0$$

If a 3rd signal is added with power $P_2$, its positive contribution to SNR occurs when:

$$P_2 > \left(\sqrt{3/2} - 1\right)(P_0 + P_1)$$

Generalizing to T summed TIAs, the equation becomes:

$$P_{T-1} > \left(\sqrt{T/(T-1)} - 1\right)(P_0 + \ldots P_{T-2})$$

In the process of deciding if TIA is to be added or not, all TIAs in the group are first sorted in descending order and the benefits of addition of every one of them is calculated by using the generalized equation above. Addition of successive sorted TIAs is permitted as long as the generalized criteria above is satisfied and terminated as soon as it becomes violated. This procedure can be performed during initial training as well as during the operation in case the power input to TIAs changes.

Figure 8:
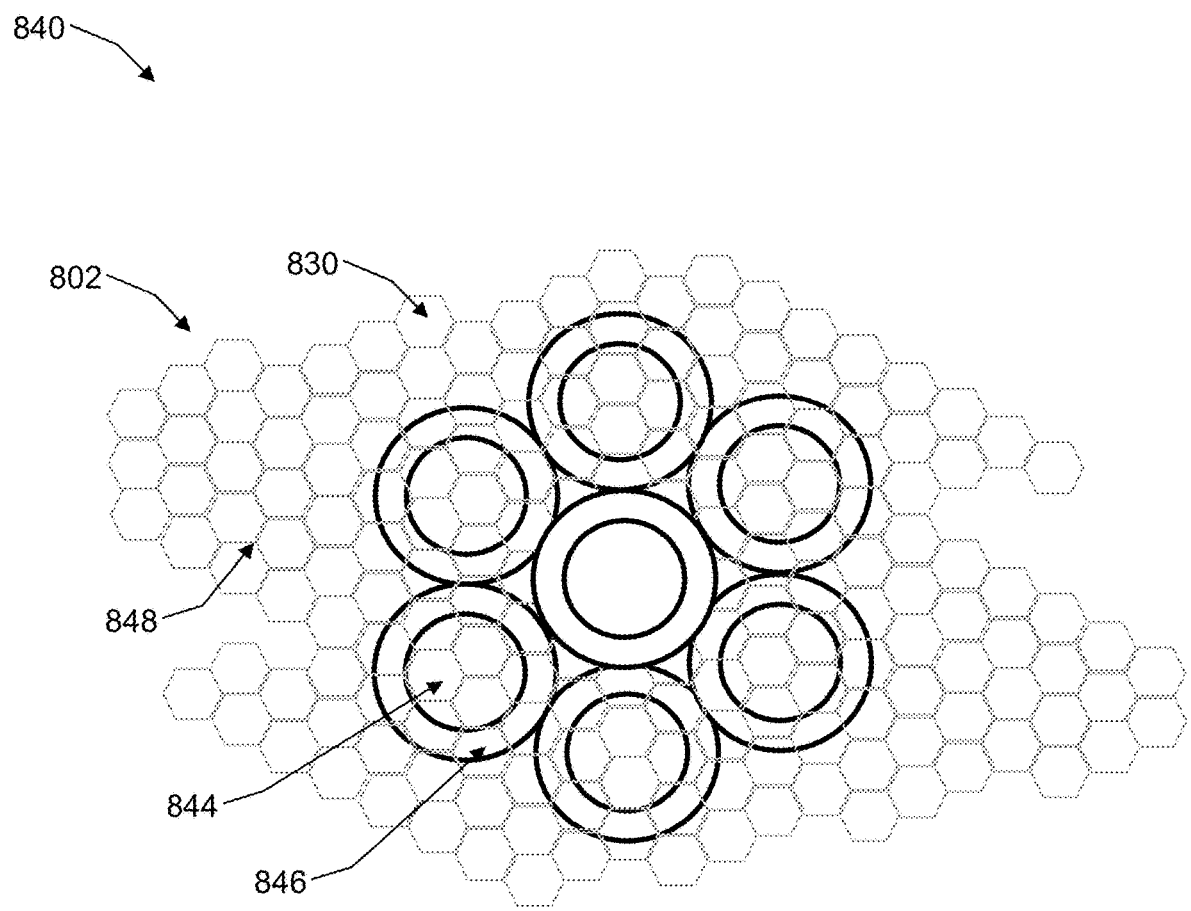
FIG. 8 is a diagram of an array of μLEDs projected spots onto a multi-core fiber cable.

FIG. 8 shows the µLEDs projected spots onto the multi-core fiber cable 840 displayed as a fiber bundle 802 (shown as a honeycomb array). The hexagonal honeycomb array represents individual fibers 830. A plurality of µLED illumination zones 844 and µLED exclusion zones 846 are shown. The µLED exclusion zones 846 shown in the present embodiment are at least 2 fibers 830 wide, and the µLED illumination zones 844 are 1 or 2 fibers 830 wide (2 fibers wide in the present example). The fiber bundle 802 makes up a fiber cable 840 and is assumed as a fixed reference point where the µLED portion of a chip 100 can have any X axis, Y axis, and angular misalignment. In the present embodiment, the fiber cores 830 are 7 µm in diameter with 1 µm cladding 848. Angular misalignment is worst near the perimeter as shown by A below.

$$\Delta A = D*\sin(\Delta\theta) \sim 450*\sin(2°) \sim 14 \text{ um}$$

It will be appreciated that other embodiments may include µLED illumination zones 844 and µLED exclusion zones 846 of any size, shape, and orientation. Additionally, other embodiments may include fiber cores 830 of different size and shape as well as larger or smaller cladding 848. The embodiment shown in FIG. 8 shall be construed as a non-limiting example.

Figure 9:
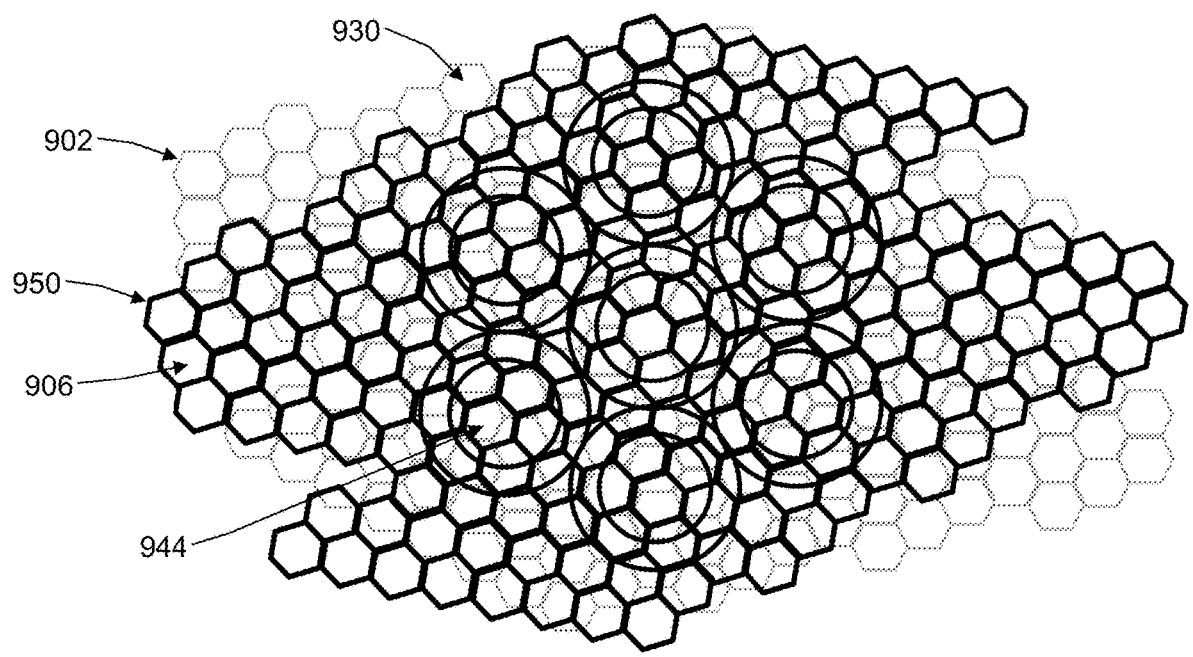
FIG. 9 is a diagram illustrating a PD array with misalignment to fiber cores of a fiber cable.

FIG. 9 is a diagram illustrating a PD array 950 with misalignment to the fiber cores 930 of FIG. 8. The figure shows a honeycomb representing individual PDs 906 overlayed onto the fiber cores 930 and illumination zones 944 of FIG. 8 to simulate a connection of a fiber cable to a chip housing the PD array 950. Groupings of 4 PDs 906 can collect from most fiber cores 930 with significant light, though still some loss is observed due to uncollected light. A grouping of 7 PDs 906 to form a flower like pattern collects nearly all of the light but requires more complex circuitry. Changing µLED illumination to 1 core improves the 4 PD collection efficiency.

Figure 10:
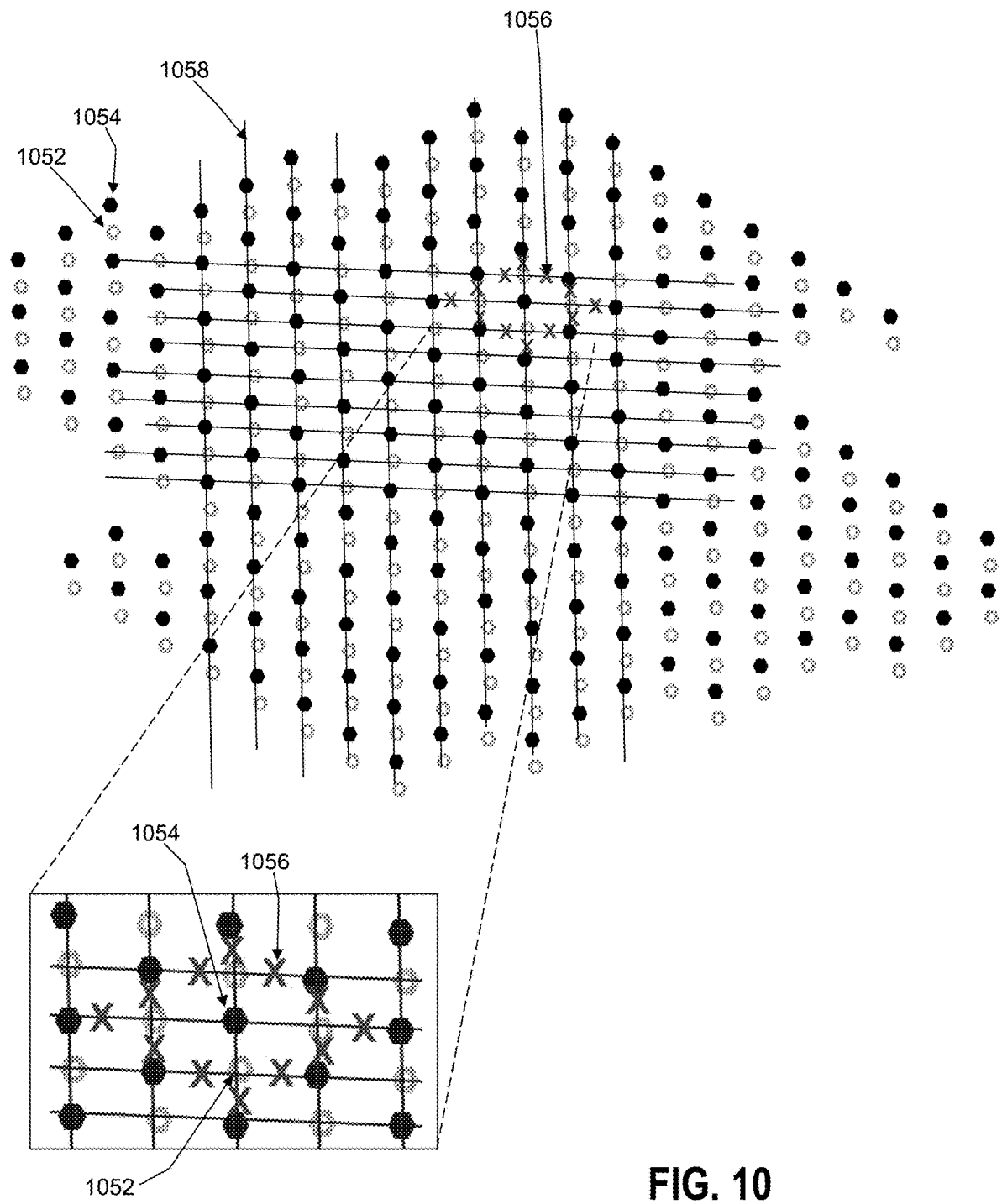
FIG. 10 is a diagram of an example fuse-based implementation with 4-PD groups.

Also contemplated herein is an implementation of the crosspoint with fuses rather than transmission gates. The selection of connected PDs in this case is different since PD currents are added before a noise-generating TIA. Therefore, it is advantageous to combine PDs even with low photocurrent. The limitation in this case is primarily due to additional capacitive loading from each connected PD, which reduces bandwidth and increases noise, to be considered as a factor while combining PDs. FIG. 10 is a diagram of an example of a fuse-based implementation with 4-PD groups.

In FIG. 10, a plurality of PD contacts 1052 and PDs aggregated into TIAs 1054 are shown. In the present embodiment, each PD has potential connections to 4 TIAs and each PD is allowed to connect to 1 TIA, with other connections broken represented by the broken connections 1056. To establish the best grouping, all PD connections are initially preserved, 1 µLED is enabled in Continuous Wave (CW) mode, and the TIA with the largest CW signal is determined. This TIA connection is preserved to 4 surrounding PDs and the other 3 connections from those PDs are broken to other TIAs.

A magnified image is also provided in FIG. 10 to better show the preserved and broken connections. The preserved connections 1058 can be seen traveling from the TIA 1054 to the 4 surrounding PDs 1052. Also more clearly seen are the broken connections 1056 from the 4 PDs to the other surrounding TIAs. The disclosed alignment circuitry connected to the µLEDs and the PDs can further be configured to select a set of fiber cores.

Figure 11:
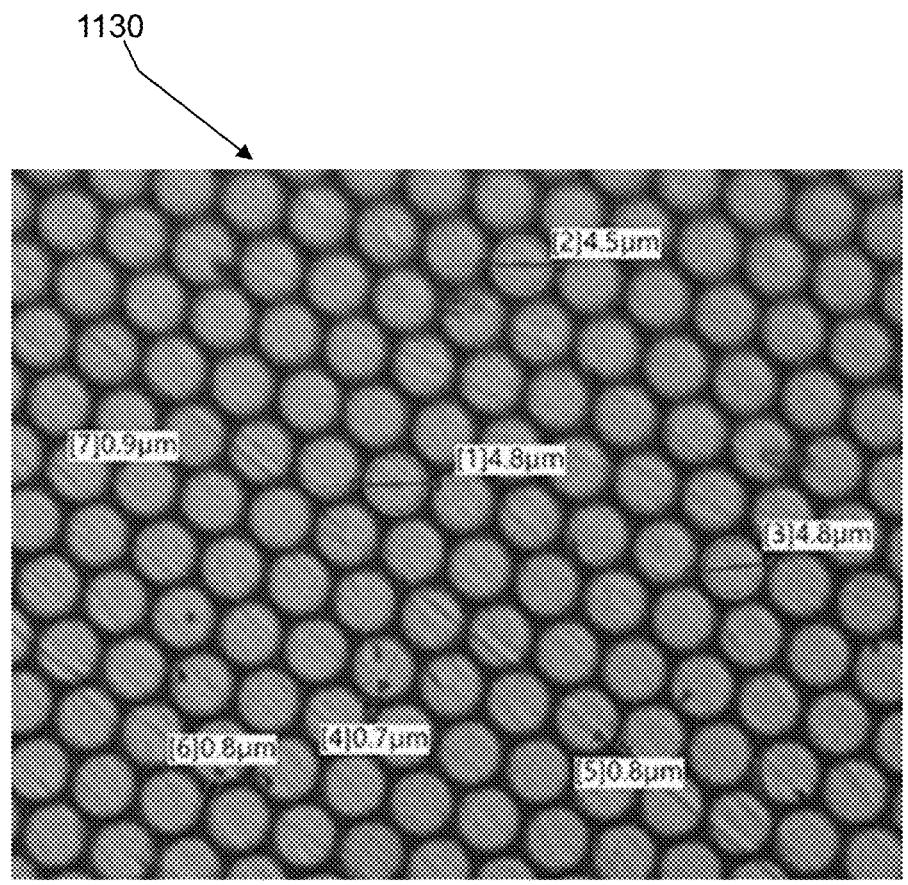
FIG. 11 is a magnified image of a cluster of fiber cores showing a slight variation in size.

The fiber cores discussed in the present disclosure are quite regular and consistent in shape, although they are not perfectly regular and can slightly vary in size and shape. Additionally, the fiber cores discussed herein can be imaging fibers known to those of skill in the art. FIG. 11 is a magnified image of a cluster of fiber cores 1130 showing the slight variation in size. The total diameter of the bundle of fiber cores shown in FIG. 11 is 0.35 mm with a total of 3,500 fiber cores 1130. The individual fiber core 1130 diameter is 5 µm with a cladding 1148 thickness of 1 µm. From the figure, the fiber cores 1130 range from a diameter of 4.5-4.8 µm while the cladding ranges from 0.8-0.9 µm. Therefore, µLED spots will have different alignments with fiber cores.

Figure 12:
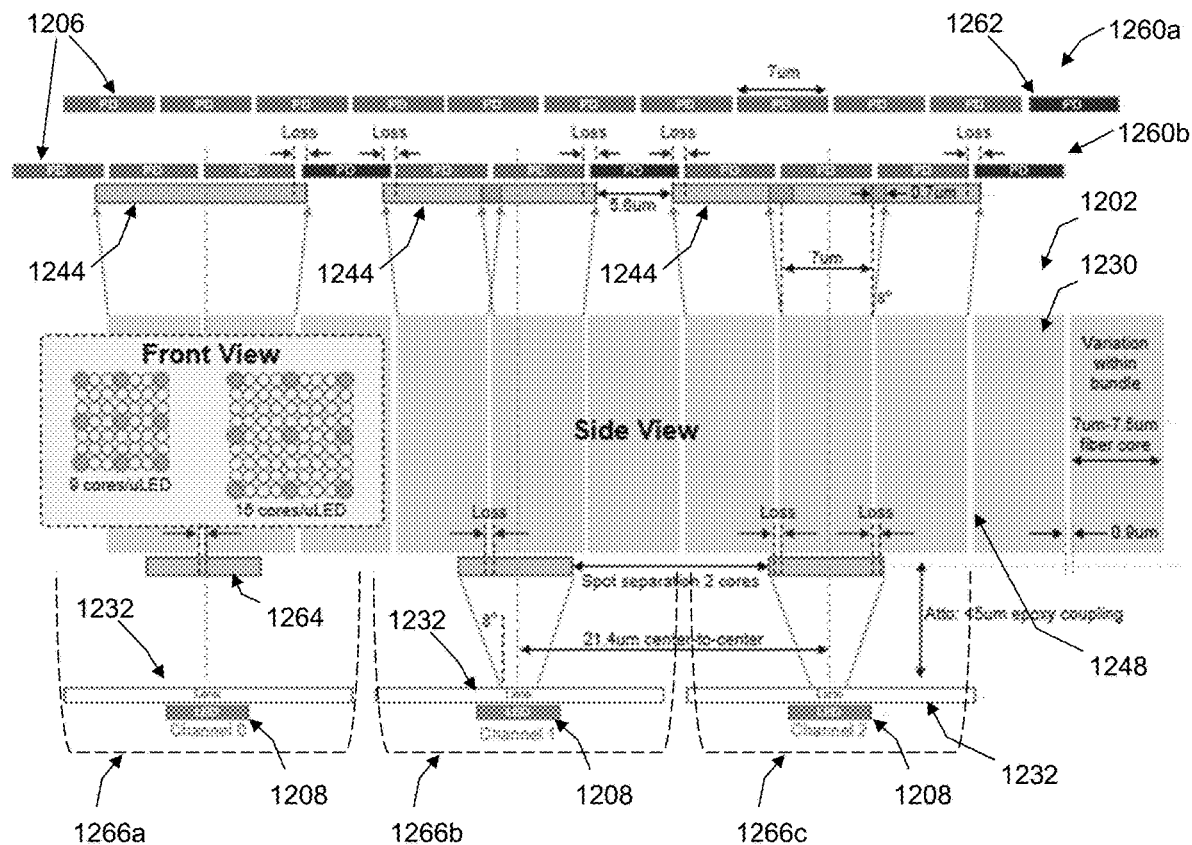
FIG. 12 is a diagram of a side view of a plurality of μLEDs and PDs aligned with a bundle of fiber cores.

FIG. 12 is a diagram of a side view of a plurality of µLEDs 1208 and PDs 1206 aligned with a bundle 1202 of fiber cores 1230. The diagram displays TX and RX sides of a connection, the connection being made by the fiber bundle 1202. The connection via the fiber bundle 1202 transmits light from the plurality of LEDs 1208 to the plurality of PDs 1206. An example side-view of 3 illumination alignments (1266a, 1266b, 1266c) is shown in FIG. 12 which shows how spot size (illumination zone) 1244 at the PDs 1206 can vary depending on alignment. Selectively disabled PDs 1206 are also shown in FIG. 12. It shows how the number of PDs 1206 used in a channel can depend on natural alignment and variation of the fiber cores 1230.

A first PD alignment 1260a of PDs 1206 is shown as an example alignment with only 1 disabled PD 1262. A second alignment 1260b of PDs 1206 shows a plurality of disabled PDs 1262, wherein disabled PDs 1262 are selected based on location and light absorption from the µLEDs 1208. In the figure, the µLEDs 1208 transmit light through a plurality of lenses 1232 and create spots 1264 with a separation equal to approximately 2 fiber cores 1230. As described previously herein, the fiber bundle 1202 includes cladding 1248 which creates loss between the fiber cores 1230. The light travels through the fiber cores 1230 and exits onto the PDs 1206 creating RX spots (illumination zones) 1244. Additional loss is encountered between the PDs 1206 with disabled PDs 1262 being selected based on where the light is not present. Overlapping illumination zones 1244 occur when two adjacent fiber cores 1230 emit light onto the PDs 1206 causing some light to overlap. Additionally, a front view is shown which depicts a 9 core distribution and a 16 core distribution. The 9 core distribution includes an µLED 1208 at every 3rd fiber core 1230, while the 16 core distribution includes an µLED 1208 at every 4th fiber core 1230.

Several of the embodiments herein describe 9 fiber cores 1230 for each µLED 1208. Allowing there to be at least 2 dark cores between µLEDs which help with crosstalk and misalignments. It will be appreciated that there may be more dark cores for additional isolation (i.e., the 16 core distribution, or others) or if limited by component dimensional constraints. Additionally, the present disclosure is not limited to µLEDs and visible blue light. Embodiments of the present disclosure include operating at longer or shorter wavelengths (e.g., 850 nm) known to those of skill in the art.

Figure 13:
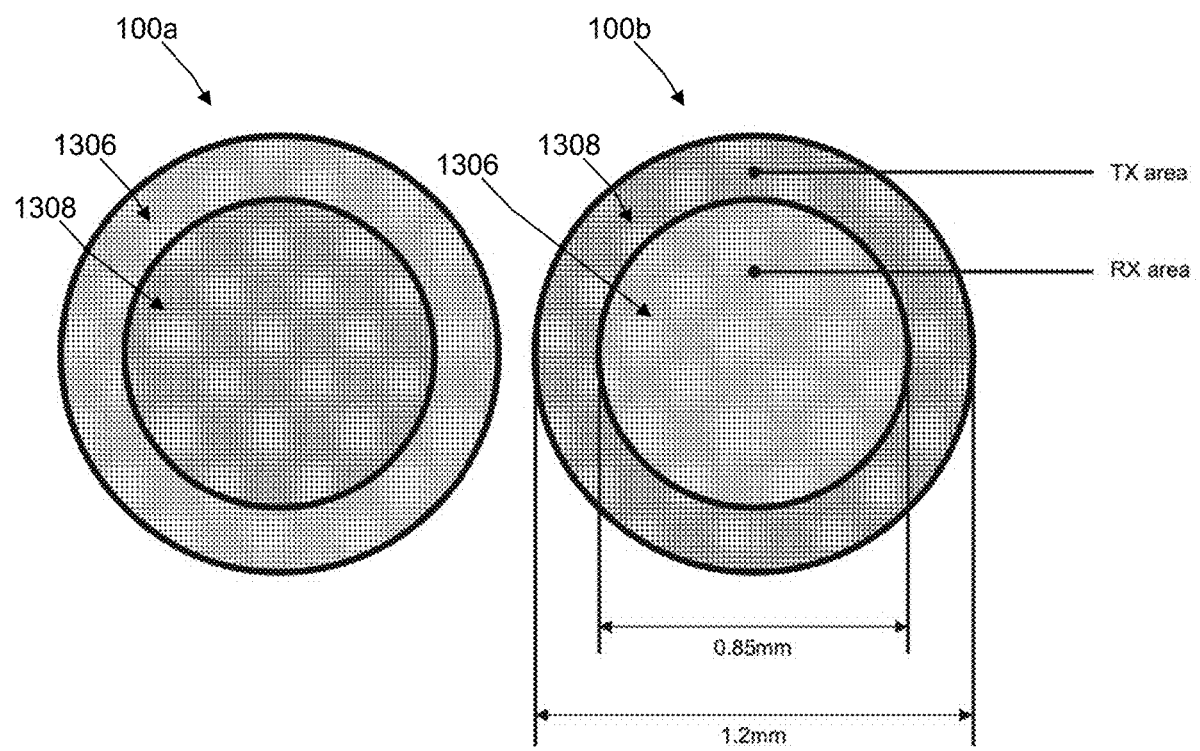
FIG. 13 is a diagram of μLEDs and PDs distributed on a chip including alternative segmentation of TX and RX areas.

FIG. 13 is a diagram of µLEDs 1308 and PDs 1306 distributed on a chip 100 including alternative segmentation of TX (µLED) and RX (PD) areas. In some embodiments, alternative segmentation of Transmit (TX) and Receive (RX) areas are contemplated where each area corresponds to about half of the area of the chip. An alternate annular mode is described herein which includes the advantage of being resistant to angular misalignment assuming satisfactory X and Y axis alignment. The figure includes a first chip 100*a* and a second chip 100*b* where the first chip 100*a* includes the μLEDs 1308 along an inner area and the PDs 1306 along an outer ring, whereas the second chip 100*b* includes the μLED 1308 along the outer ring and the PDs 1306 along the inner area. The first chip 100*a* and second chip 100*b* demonstrate two sides of a connection, where the μLEDs 1308 from the first chip will transmit light through fiber cores of a fiber cable onto the PDs 1306 of the second chip 100*b*, and the μLEDs 1308 of the second chip 100*b* will transmit to the PDs 1306 of the first chip 100*a*.

In various embodiments, different numbers of TX and RX areas are contemplated. For example, a chip can include any number of TX (μLED) areas and any number of RX (PD) areas. Additionally, any combination of TX and RX areas are also contemplated herein, for example a different number of TX areas than RX areas. The embodiments disclosed herein showing one TX area and one RX area shall be construed as a non-limiting example.

Again, the present disclosure provides various features for increasing tolerance to misalignment of optical transceivers described herein. The annular partitioning of μLED and PD arrangements described herein allows for angular insensitivity of fiber alignment. Further, additional μLED and PD devices can be strategically located near split lines (i.e., the border between μLEDs and PDs) to allow for additional coarse misalignment tolerances. Various embodiments include utilizing dark (unilluminated) fiber core guard bands between μLED devices to increase tolerance to misalignment between μLEDs, imaging fiber (fiber cores), and PDs. Various embodiments include minimizing dark areas between PDs to increase light collection efficiency. The ability to selectively combine signals from multiple PDs greatly improves SNR and thereby link budget. Selection of specific PD groupings is implemented either at manufacturing and fixed, or during operation. If selection of specific PD groupings is done during operation, it should facilitate extensions to connectorized fibers and or external fiber patch cord use with possible angular and Cartesian (X,Y) misalignment. A specific efficient procedure for determining the particular grouping of PDs into a single data channel output is also utilized by various embodiments of the present disclosure. PD membership in a grouping may be dependent on a limiting parameter. For example, post-TIA summation is limited by TIA noise and its impact on SNR. Direct PD photocurrent summation is limited by PD capacitance and impact on bandwidth. Further, various embodiments include an additional guard band on areas of devices (optical transceivers) that may be either more expensive or more prone to failure.

Network Context

Table 1 below provides a context of the interconnect cabling market. The present disclosure focuses on a module and technique to address 10 m and less to avoid the cost burden of longer reaches (e.g., 300 m). Of note, the inventors submit there is a need for high-bandwidth interconnects at 10 m and less.

TABLE 1

| Addressable Volume | Max Reach | Racks | System BW |
|---|---|---|---|
| 'Hundred thousands' | 300 m | Multi-rack same room (blast radius) | >96 Tb/s |
| 'Millions' | 10 m | Adjacent 3-rack | 192 Tb/s |
| 'Billions' | 1 cm–2 m | Single-rack | 96 Tb/s |

Table 2 below provides a context of the existing approaches and costs relative to the present disclosure. This example assumes a 400 Gb/s interconnect, but the present disclosure also contemplates 800 Gb/s and higher including 1 Tb/s and beyond.

TABLE 2

| 400G cable | Cost | Comments |
|---|---|---|
| 2 m DAC | $X | Twinax power increasing, reach decreasing, install issues. |
| 10 m Present disclosure | $2X | Low cost: μLED array, non-precision alignment, integrated micro-optics, low baud rate MIMO, MMF, standard form factor. |
| 7 m AEC | $5X | Install issues, reach issues, copper BW limits. |
| 10 m Open-eye AOC | $6X | Marginally cheaper due to simpler equalization |
| 10 m VCSEL AOC | $8X | high power and complexity |
| CPO | $8X | high power and complexity |

Optical Link

Figure 14:
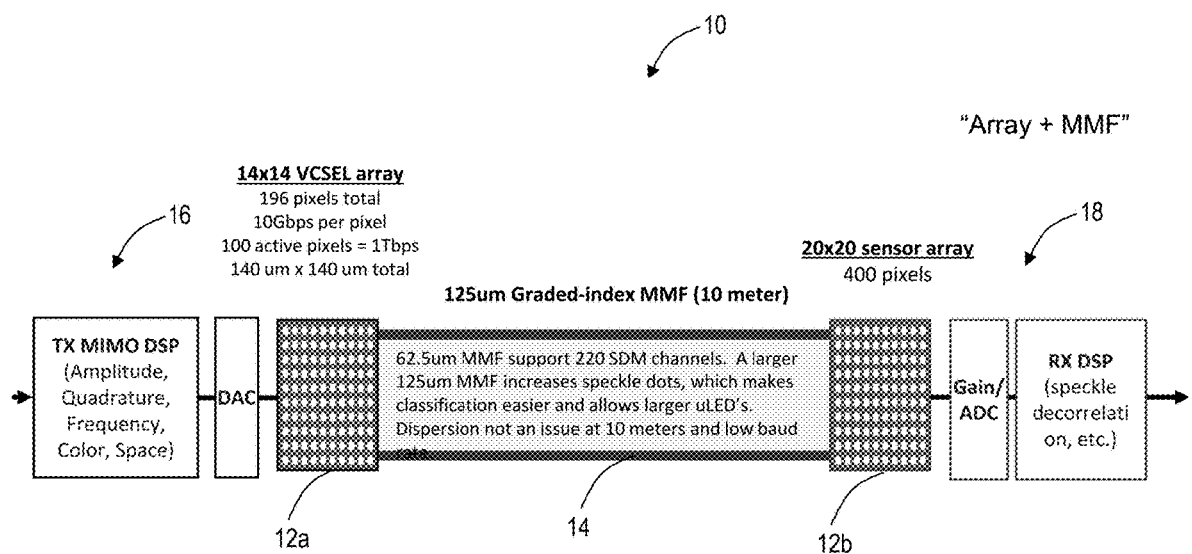
FIG. 14 is a diagram of an optical link showing the VCSEL array on both ends of MMF fiber along with a transmitter circuit and a receiver circuit.
Figure 15:
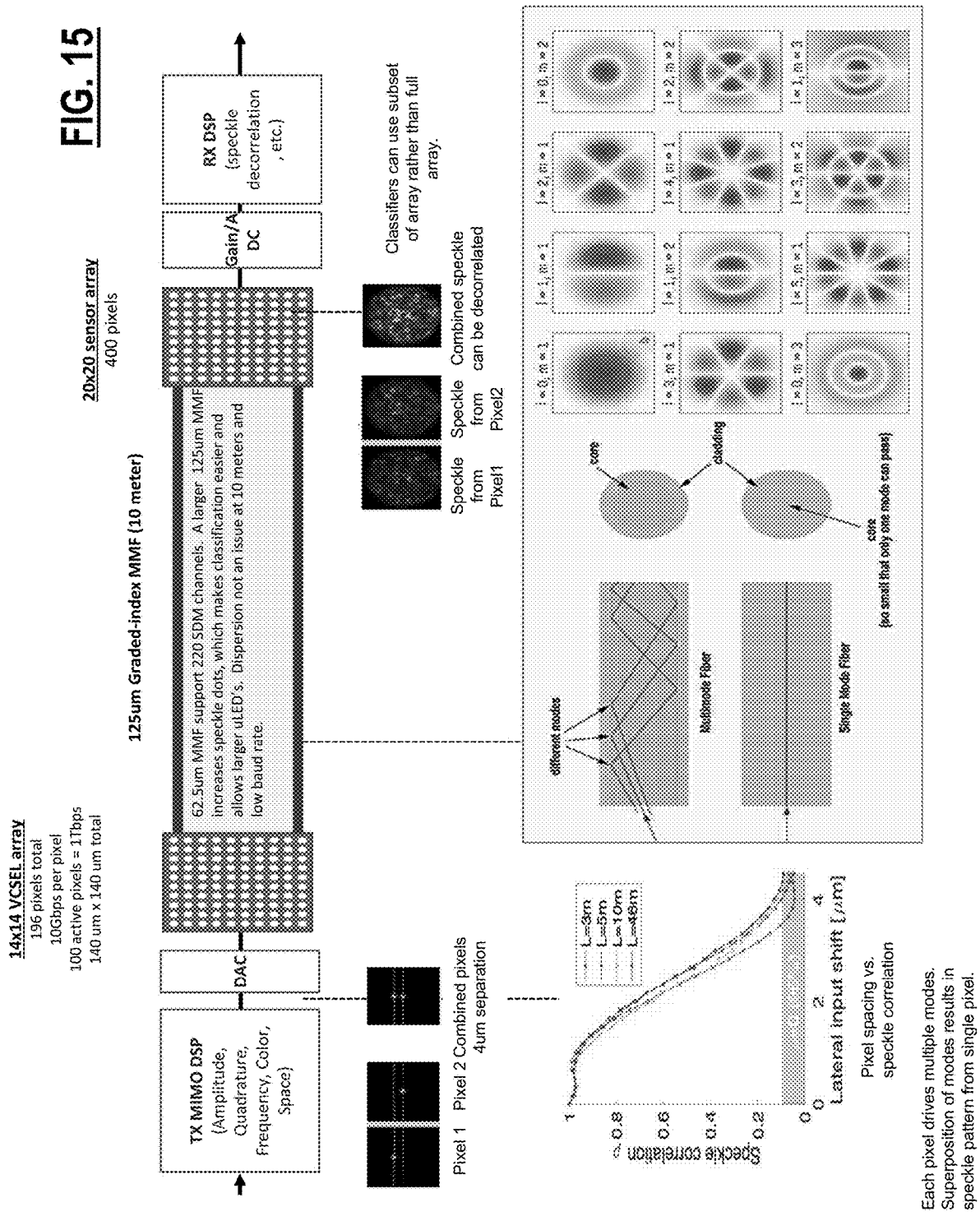
FIG. 15 is a diagram of the optical link of FIG. 14 illustrating orthogonal speckles on the MMF fiber.
Figure 16:
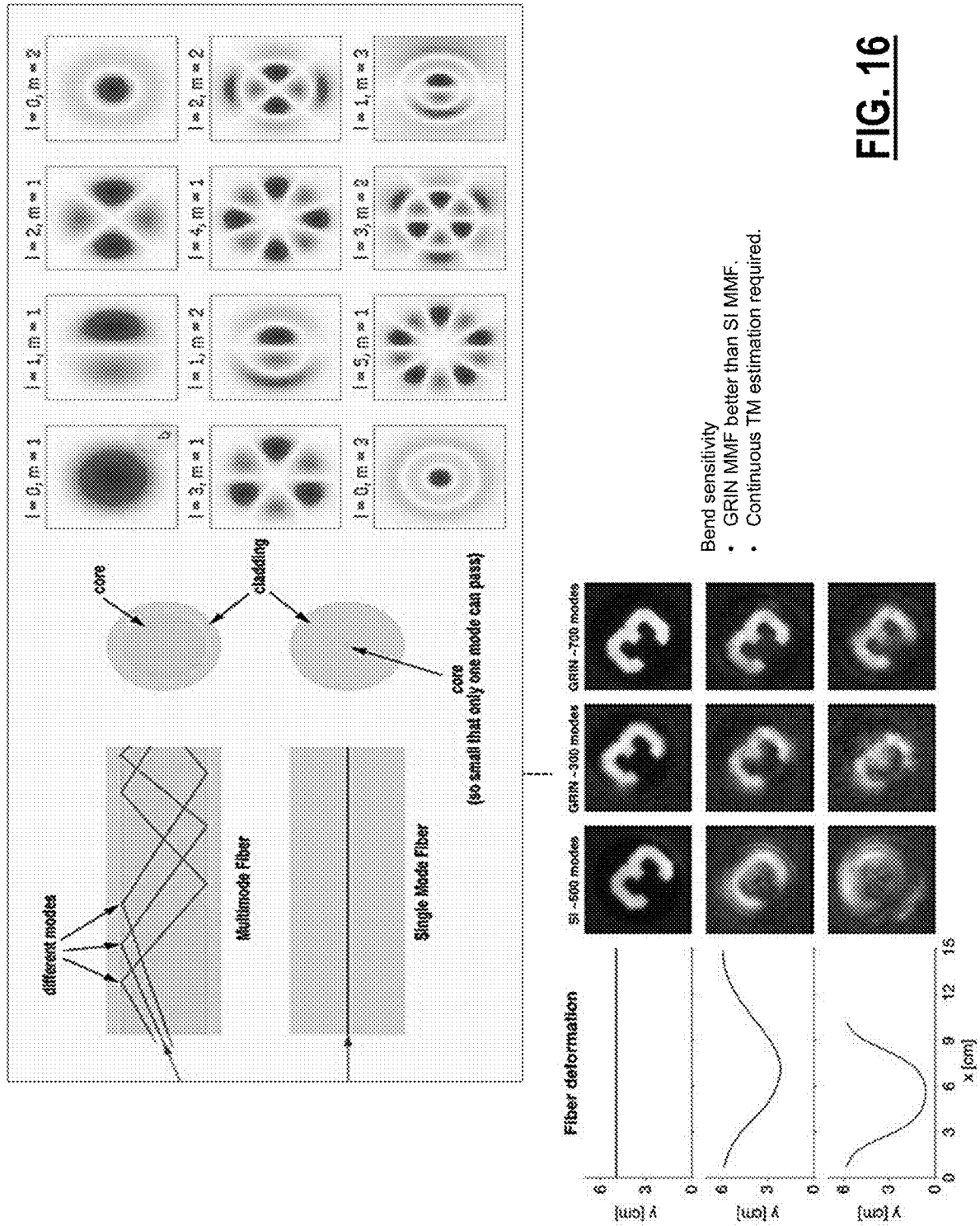
FIG. 16 is an illustration of modes of single- and multi-mode fibers and a diagram of the optical link of FIG. 14 illustrating bend sensitivity on the MMF fiber.
Figure 17:
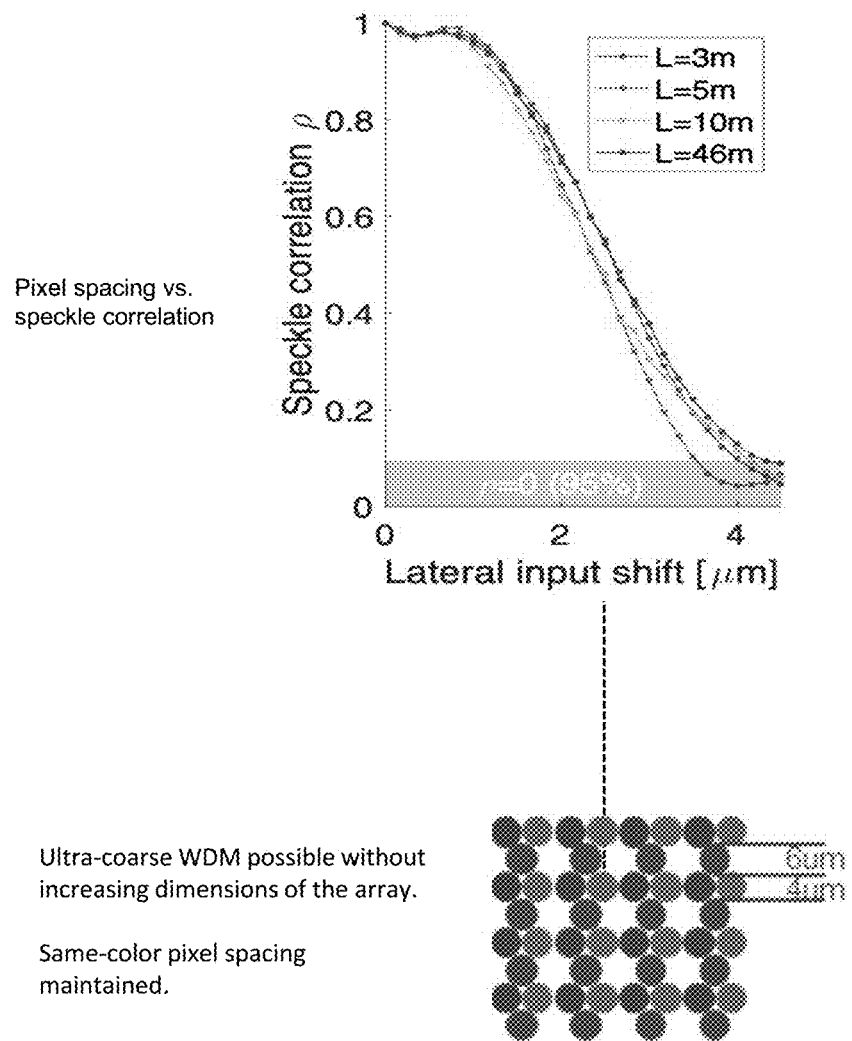
FIG. 17 is a diagram of the optical link of FIG. 14 illustrating ultra-coarse Wavelength Division Multiplexing (WDM) on the μLED array.

FIG. 14 is a diagram of an optical link 10 showing the VCSEL array 12*a*, 12*b* on both ends of MMF fiber 14 along with a transmitter circuit 16 and a receiver circuit 18. FIG. 15 is a diagram of the optical link 10 illustrating orthogonal speckles on the MMF fiber 14. FIG. 16 is a diagram of the optical link 10 illustrating single-mode and multi-mode fiber modes and bend sensitivity on the MMF fiber 14. FIG. 17 is a diagram of the optical link 10 illustrating ultra-coarse Wavelength Division Multiplexing (WDM) on the VCSEL array 12*a*. For simplicity of illustration, the optical link 10 is shown in a unidirectional configuration. Those skilled in the art will recognize a practical application will include a bidirectional configuration with another set of equipment. For example, the VCSEL arrays 12*a*, the PD arrays 12*b*, the transmitter circuit 16, and the receiver circuit 18 can be integrated in a single form factor, such as a module, circuit, etc.

The transmitter circuit 16 includes a transmit Multi-Input Multi-Output (MIMO) Digital Signal Processor (DSP) connected to a Digital-to-Analog Converter (DAC) that connects to the VCSEL array 12*a*. In an embodiment, the VCSEL array 12*a* is a 14×14 array with 196 total pixels, supporting 10 Gb/s per pixel. With 100 active pixels, this supports 1 Tb/s and has a size of about 140 μm×140 μm.

The MMF fiber 14 can be a 125 μm graded-index MMF (GRIN MMF) of about 10 m. 62.5 μm MMF support 220

SDM channels. Dispersion is not an issue at 10 m and low baud. The VCSEL array 12a is configured to drive the GRIN MMF fiber 14. The VCSEL array 12a is larger than the MMF input facet.

The VCSEL array 12a can be a RGB VCSEL array whereby different-color VCSELs are placed closer together. The VCSEL array 12b is a sensor without a RGB passive color filter. This because speckle patterns are orthogonal with sufficiently different wavelengths. The VCSEL arrays 12a, 12b can be on-die, integrated devices.

A training algorithm determines which VCSELs are able to couple light into the MMF fiber 14 and which are not. This avoids precise manufacturing alignment requirements. A continuous training algorithm detects dynamic physical perturbation (e.g., bending, temperature, vibration) in the MMF fiber 14 and recalibrates a Transmission Matrix. This can also be used to detect physical tampering for high-security systems, detect seismic activity, detect cable movement by installer, etc.

The MMF fiber 14 connects to the VCSEL array 12b which can include a 20×20 sensor array with 400 pixels. The receiver circuit 18 includes a gain and Analog-to-Digital Converter (ADC) and a receiver DSP.

The present disclosure includes a low symbol rate that avoids Intersymbol interference (ISI) issues due to modal dispersion and chromatic dispersion at <10 m distances. This applies even at blue wavelengths of ~500 nm.

Advantageously, the optical link 10 can be constructed with current, consumer technology, i.e., the VCSEL arrays 12a, 12b with integrated lens, sensor array. The present disclosure exploits various Orthogonal dimensions: Amplitude/Phase/Frequency/Color/Space to obtain high-capacity at low-cost.

The present disclosure also contemplates other types of MMF 14, such as large-diameter (1000 μm) multimode GRIN POF (Plastic Optical Fiber) such as OM-GIGA.

The present disclosure also contemplated single-fiber bidirectional operation without a beam splitter by having μLED's and sensors integrated on the same array.

The present disclosure can include multiple FMF (Few Mode Fiber) fan-out cables (optical-to-optical repeater demux).

Training and Forward Error Correction (FEC)

Figure 18:
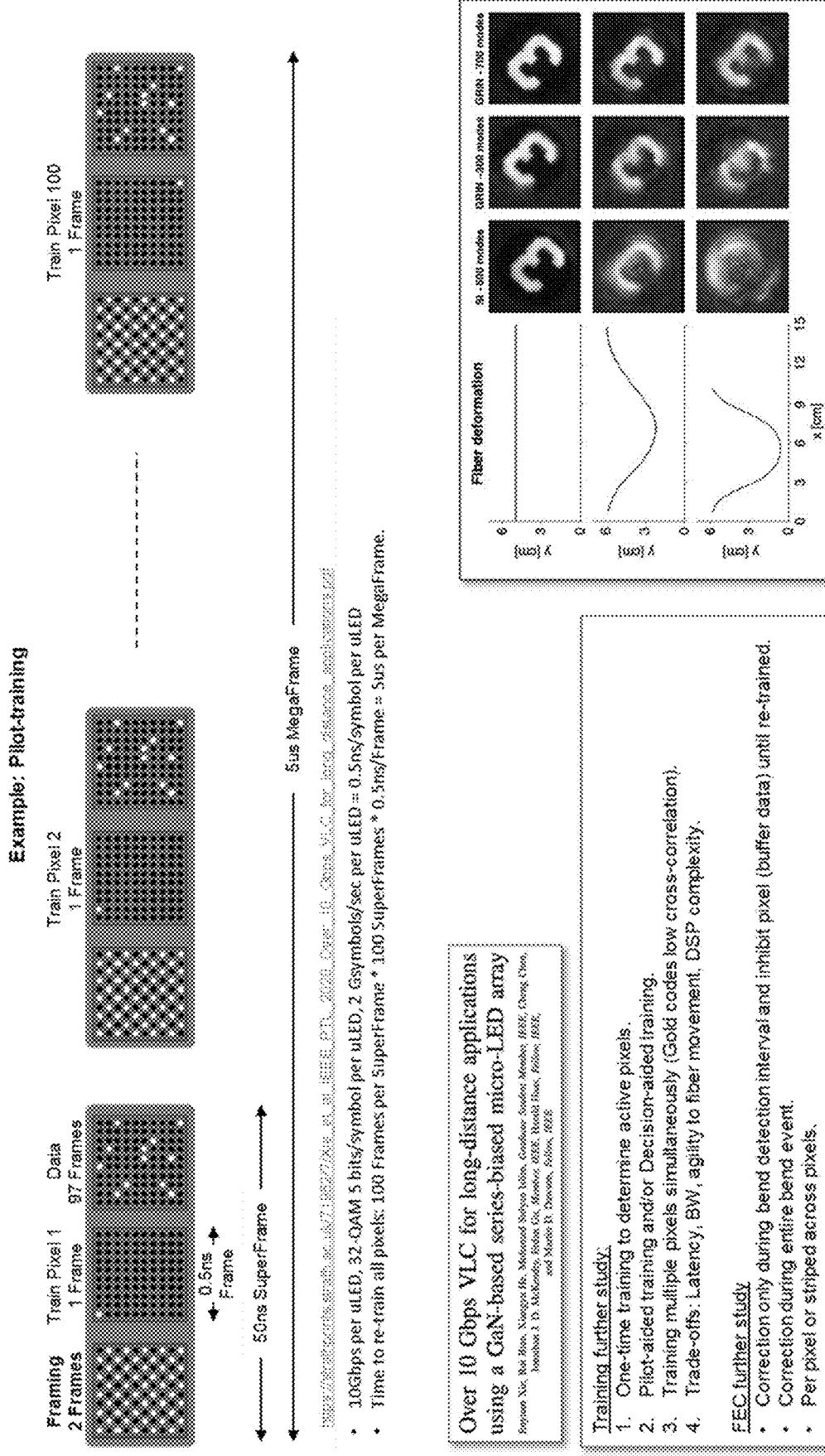
FIG. 18 is a diagram of a training and Forward Error Correction (FEC) process for the μLED arrays in the optical link of FIG. 14.

FIG. 18 is a diagram of a training and Forward Error Correction (FEC) process for the VCSEL arrays 12a, 12b.

Mode Group Diversity Multiplexing (MGDM)

Figure 19:
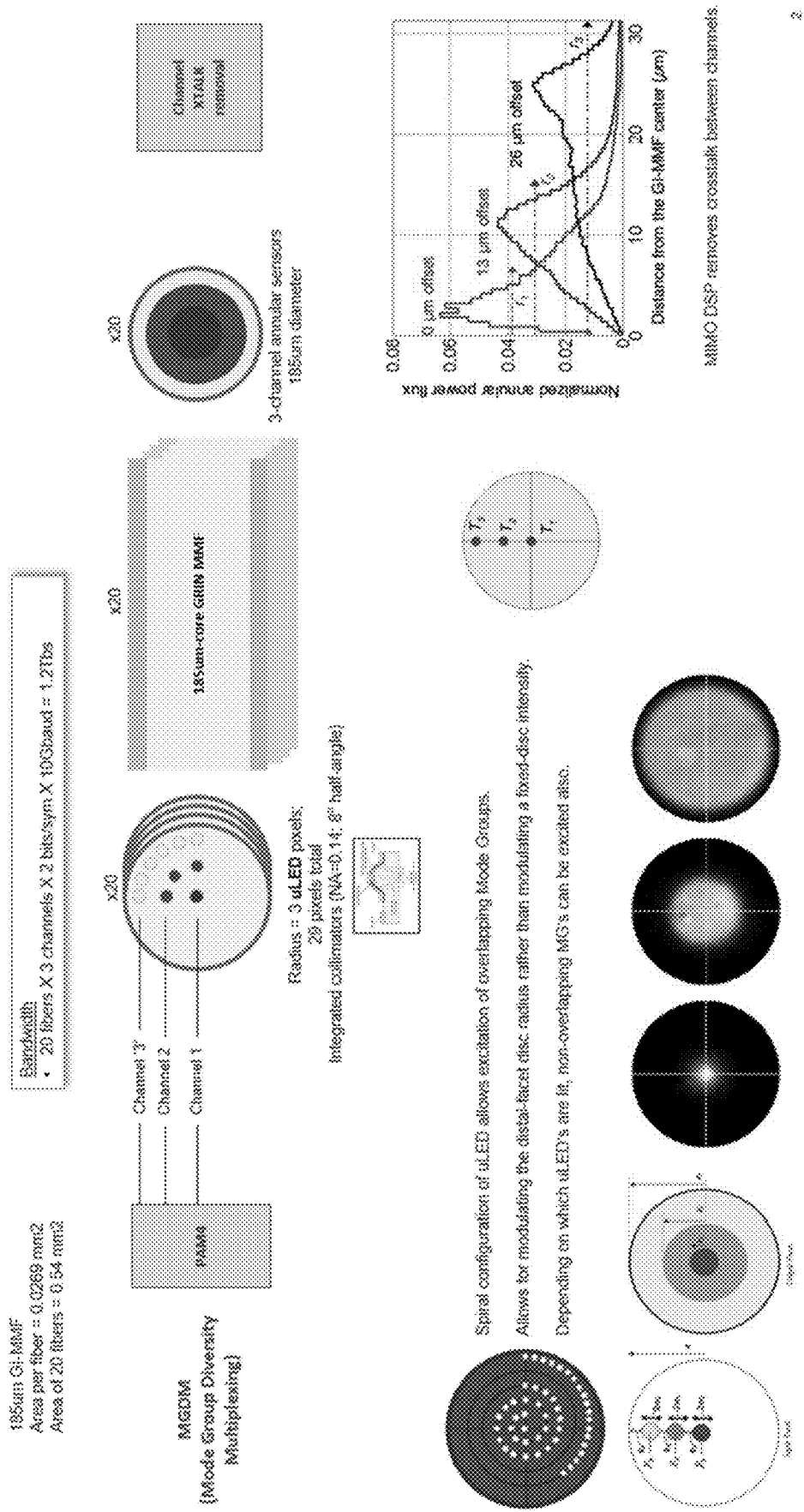
FIG. 19 is a diagram showing a method of Mode Group Diversity Multiplexing (MGDM)

The VCSEL pixels are separated sufficiently to drive separate mode groups and thus results in separate SDM channels. Received patterns are decorrelated to recover data. This is Mode Group Diversity Multiplexing (MGDM), which is illustrated in more detail in FIG. 19.

Classifier

One limitation of the proposed SDM concept lies in the number of channels an MMF fiber 14 can support. To quantify this, we consider the minimal required spatial separation of optical inputs on the fiber's entrance facet. Each input can be said to occupy the area of a circle with a diameter equal to this minimal separation, approximately 4 in our experiments. Close-packing of these equal circles yields a maximum packing density n of just over 90%. With $A_{input}$ the area occupied by each input, and $A_{fiber}$ the area of the MMF core, we can thus calculate the maximal number of inputs N which could operate as parallel SDM channels. We find $N \leq \eta A_{fiber}/A_{input}$ and for an MMF with a core diameter of 62.5 this results in $N \leq 220$. In such a scenario however, the number of channels supported by this SDM approach is more likely limited by the potence of the receiver's pattern classification method.

The correlation-based classifier has to separate non-zero cross-correlations as low as $1/\sqrt{N}$ from zero-mean cross-correlations. This becomes harder for larger N. A partial solution would be to reduce the statistical noise which distorts these correlation coefficients. This can be achieved by increasing the number of speckle spots (currently ~300~300), e.g., by using an MMF with a larger core. On the other hand, the classification results obtained with the linear classifiers suggest that the number of speckle intensity samples should only exceed the number of SDM channels by a small margin in order to obtain robust operation. Therefore, also the number of speckle spots across the fiber end facet only needs to exceed the number of SDM channels by a small margin. As a rule of thumb, when fewer SDM channels are required, then also fewer fiber modes are needed to produce the required amount of speckle spots. So, in this classification scheme, the use of an FMF (with smaller core size) is actually favorable compared to an MMF. In general, the classification becomes harder for large N.

The patterns generated by multiple beams have a lower speckle contrast than the patterns generated by any single beam, of which the speckle contrast $C_1$ is approximately $1/\sqrt{2}$ due to polarization diversity. When n lasers are on simultaneously, the speckle contrast is reduced to $C_1/\sqrt{n}$. In general, a lower speckle contrast is expected to make the pattern classification task more difficult, as in this context the speckle contrast can be viewed as a signal-to-noise ratio.

Detectors in such an array only need to sample the local speckle intensities (rather than full-view imaging).

Pulse Broadening

For Chromatic dispersion, Units: ps/(nm*km), a Blue μLED is nominal 500 nm, MMF is around 100 ps/(nm*km). The Spectral line width for μLEDs is 20-100 nm, but μLED's have gone down to 5 nm. Assume 10 nm spectral width for our example.

$$100 ps/(nm*km)*10\ nm*(1/500 km) = 2ps\ \text{chromatic dispersion}$$

Relative to a 500 ps symbol period, a simple guard band is sufficient.

For modal dispersion, GRIN fiber reduces modal dispersion. In GRIN fiber the longer-length paths spend most of their time in lower refractive index material where the velocity is faster. The shortest path is the axial path which spends all its time in the higher-refractive index material and has the slowest velocity. Opposite trends of path length and refractive index contribute to reduction of modal dispersion.

But if we simply compare slowest and fastest paths in GRIN fiber, that yields a worst-case modal dispersion. We will have a better-case scenario because each μLED will excite a subset of MMF modes. Assuming each μLED micro-optical lens collimates the light the number of excited modes is roughly determined by the ratio of μLED beam diameter to fiber facet area. So roughly 100 times fewer than the total modes in MMF and hence 100× less than the worst-case MMF modal dispersion.

A GRIN MMF with a realistically imperfect profile probably has a pulse broadening of about 500 ps/km. So, the pulse broadening for a 2 m fiber would be 1 ps across all modes. That is a minimal guard band to insert into a 500 ps symbol period. And realistically the pulse-broadening is 100× smaller since we're exciting a subset of modes as discussed above.

Thus, we can utilize static captures of speckle patterns because pulse broadening at our symbol rates should be a non-issue. This reduces equalizer complexity therefore lowers product cost.

Architectural Tradeoffs

TABLE 3

Table 3 illustrates Architecture choices and trade-offs

| Architecture trade-offs | Cost | Power | Comments |
| --- | --- | --- | --- |
| Copper Twinax/Fiber | — | ↓ | Fiber has long runway, lower power at higher rates, lower space/weight, better installability. Copper becoming increasingly impractical (power/bit, 224G Xtalk, etc). |
| 2 m/10 m/100 m/300 m | ↓ | ↓ | Low-cost: Focus on ultra-short reach, which reduces complexity due to Modal/Chromatic dispersion and loss. |
| Polarization/OFDM QAM (Amplitude & Phase of subcarriers)/WDM/SDM | ↓ | | SDM is a large multiplier. |
| SISO/MIMO | ↓ | — | Per pixel data rate can equal or be close to lowest possible power CMOS interface rate. Excite multiple fiber modes simultaneously reduces in/out light coupling cost. Low-baud enables parallelized DSP and slow µLED's. |
| MCF/FMF/Graded-index MMF/Hollow Core/ GALOF/Coherent fiber bundle/Non-coherent fiber bundle | ↓ | ↓ | MCF reduces light-gathering area, requires precision alignment, still has Xtalk between cores, more expensive. GALOF (Glass-air Anderson Localizing Optical Fiber) can simplify solution (reduce cost/power) in the future by eliminating need to adapt to fiber bend effects. |
| µLED/VCSEL/DFB | ↓ | ↓ | Don't rule out VCSEL for future, but desire to ride consumer technology/cost curves of µLED's. |
| Linear classifiers/Deep Learning Neural Net/ Analog Signal Processing | ↑ | ↑ | Evaluate Neural Nets, butgut feel is that they are for folks who don't have the skills to model the system; NN's not necessarily fast/efficient. Analog Signal Processing is something to look at . . . mask sets are relatively low cost. |
| Precision manufacturing alignment/Oversized arrays | ↓ | | Physical calibration is costly in manufacturing; additional undriven pixels less costly. One-time training sequence determines active pixels. Injection point doesn't need to be precise because we count on mode mixing to spread a pixel over the full fiber facet. |
| Level of integration: External Lens/Integrated µLED micro-optics/ Integrated µLED & Sensor | ↓ | ↓ | Eliminates cost of external lenses. |
| Form factor: Pluggable/ CPO RLS | — | — | OSFP-XD/QSFP-DD form factor allow full range of reach (2 m to hundreds of km). CPO still uses lots of faceplate and never going to go hundreds of km. Shared lasers not necessarily a good redundancy model. |
| Chiplet interconnect | | | Match optical baud rate to electrical baud rate to avoid gear box. 10-20 Gbps electrical today. |

Non-Datacom Applications

The present disclosure is described with reference to datacom, butthose skilled in the art will appreciate other applications are also contemplated, such as imaging. This can include "-oscopy" such as Medical Endoscopy, Industrial Boroscopy (sewers, machinery, structures, engine blocks), Microscopy, and the like. Also, this can be used for integrating a sensor and a display for an in-screen fingerprint sensor. Even further this can be used in automotive—cars have numerous cameras and this will increase. Fiber bundles enable camera arrays in compact spaces: 3D imaging.

Optical Switch System

In the present disclosure, embodiments provide a novel implementation using µLED based optical links in combination with electronic crosspoint switches. This simultaneously achieves low latency, low cost, low power, and high bandwidth. The invention includes µLED & PD (Photodetector) IO and an electronic crosspoint switch all on a single chip (or vertical 3D stack of chips) (refer to FIG. 1-FIG. 13). The μLED based optical links provide a low cost and low power optical interconnect while sacrificing optical reach to <10 m. The present disclosure describes a specific embodiment for simplicity, but it will be appreciated that other arrangements are contemplated in other embodiments.

Figure 20:
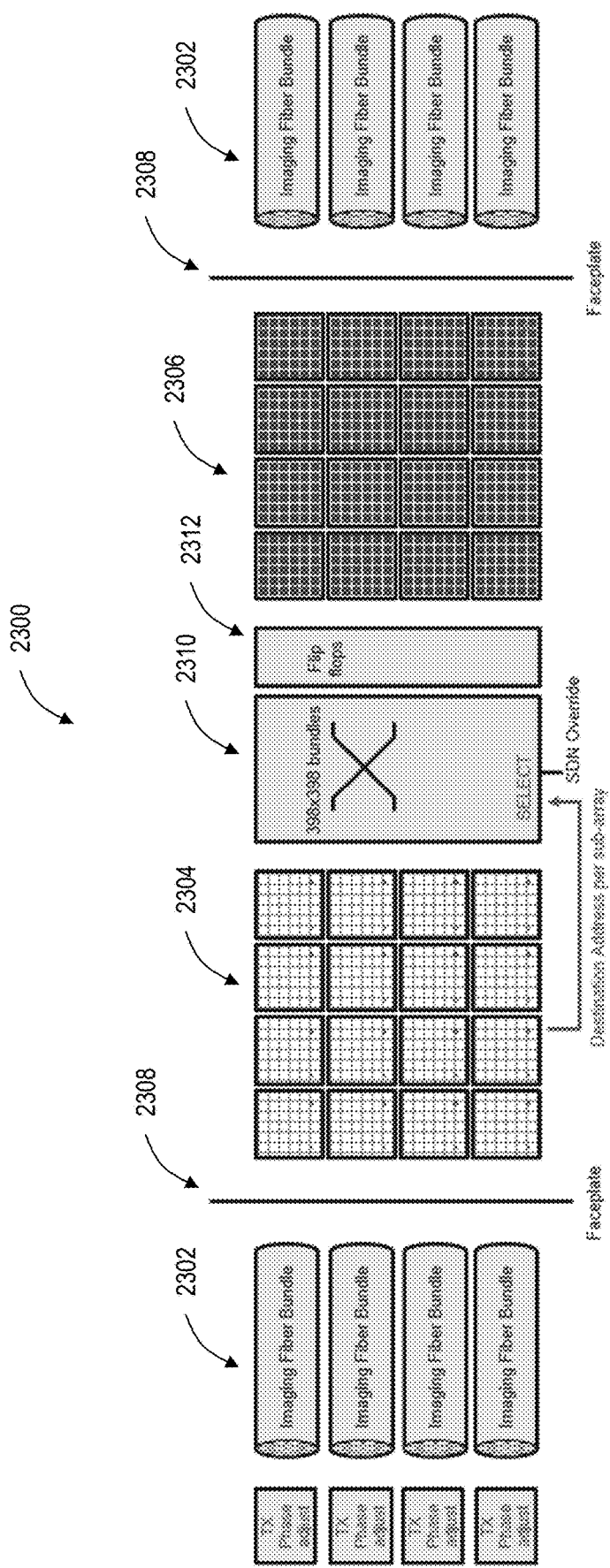
FIG. 20 is a diagram of imaging fiber bundles linked to the optical switch system of the present disclosure.

FIG. 20 is a diagram of imaging fiber bundles 2302 linked to the optical switch system 2300 of the present disclosure. Fiber bundles 2302 combine hundreds or thousands of individual transmission fiber cores with thin cladding between each core and with preserved physical position of cores between input and output facets. The imaging fiber bundles 2302 of the present embodiment each contain about 4000 cores and pass 1.6 Tb of data, with a typical channel rate below 10 Gbps (several fiber cores 'image' one source to a receiver). In an embodiment, the imaging fiber is <1 mm in diameter and an entire chip can handle 1250 such bundles, which is 2000 Tb total IO capacity. The fiber bundles 2302 are all de-jacketed and grouped together to land on the photodetector (PD) array 2304 on the faceplate 2308 of the chip. The diagram shows square arrays, but these arrays can be circular or other shapes known to one of skill in the art. Also shown are separate PD arrays 2304 and μLED arrays 2306, but these can be intermingled in various shapes as well (refer to previous sections of this disclosure).

In the present embodiment, for example, each fiber bundle 2302 has 402 channels carried on 4000 individual fiber cores. Each channel may operate at 4 Gbps NRZ with 1 clock-only channel, 1 address channel, and 400 data-only channels. Additionally, the PD arrays 2304 of the present embodiment can support 1250 1 mm sub-arrays where a given sub-array maps to a single fiber bundle 2302. The μLED arrays 2306 can similarly support 1250 1 mm sub-arrays. An electronic crosspoint switch 2310 allows the optical switching system 2300 to switch at the fiber bundle level and additionally be buffer-less, while flip flops 2312 re-time each wire. It will be appreciated that the embodiment shown in FIG. 20 is a non-limiting example, and the number of fiber cores, fiber bundles, PD arrays, and μLED arrays can be different in other embodiments.

Figure 21:
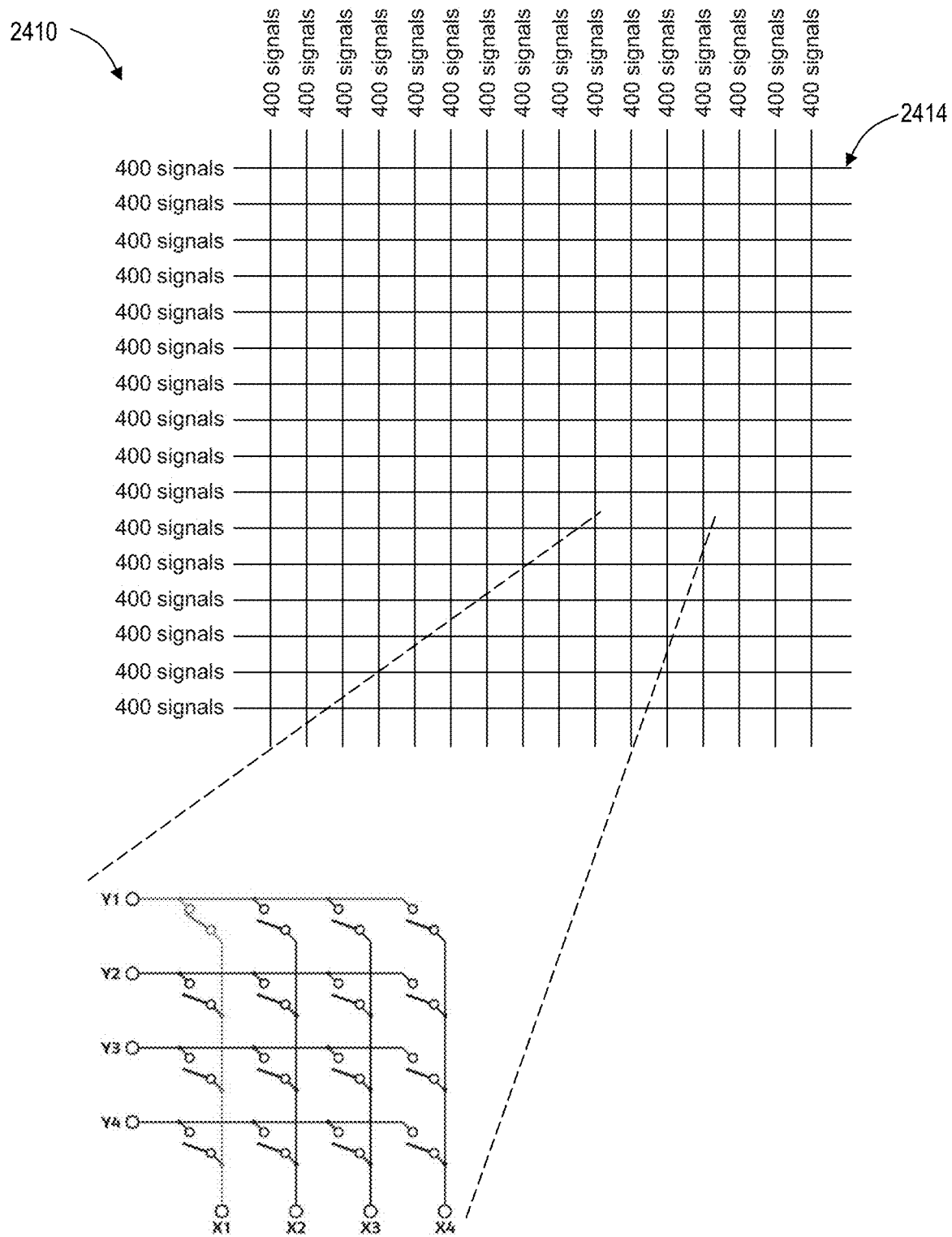
FIG. 21 is a diagram of the non-blocking crosspoint switch of the present disclosure.

FIG. 21 is a diagram of the non-blocking crosspoint switch of the present disclosure. In the present embodiment, the crosspoint switch 2410 includes a plurality of ports 2414 where each port includes a plurality of signals. A port 2414 may be several data channels synchronously grouped together to transmit a standards-compliant higher data rate signal (i.e., 100 Gb Ethernet, OTU4, ODUFlex, 400 Gb Ethernet, etc.). In the present embodiment, the crosspoint switch includes 398×398 ports, each including 400 signals resulting in 64M intersections. Each intersection includes 2 transmission gate transistors resulting in a total of 128M transmission gate transistors. Each μLED IO (including driver) takes about 36×36 μm of space and 400 μLEDs are used per bundle. With 398 bundles, this results in 159.2 k μLEDs taking up about 15×15 mm. with control logic, the chip becomes a 50×50 mm chip. For power, μLEDs are 20 mW/112G resulting in 114 W. it will be appreciated that the present embodiment is a non-limiting example, and any combinations of the components disclosed herein are contemplated. Additionally, each input port and each output port can include a plurality of signals forming an aggregate signal.

In various embodiments, μLED drivers and PD TIAs are on the same substrate as the crosspoint switch ASIC. The clock signal is transmitted on a separate μLED link and associated with several data channels forming a single port, which makes clock recovery much more simple and lower power. There may be 1 or more ports associated with a single fiber bundle. Combining clock and data channels with crosspoint switches is contemplated, such that somewhat randomized association of received data and clock is compensated by the crosspoint, and correct input and output mapping is restored with proper clocking to provide full 3R signal regeneration (Reamplify, Reshape, Retime).

Figure 22:
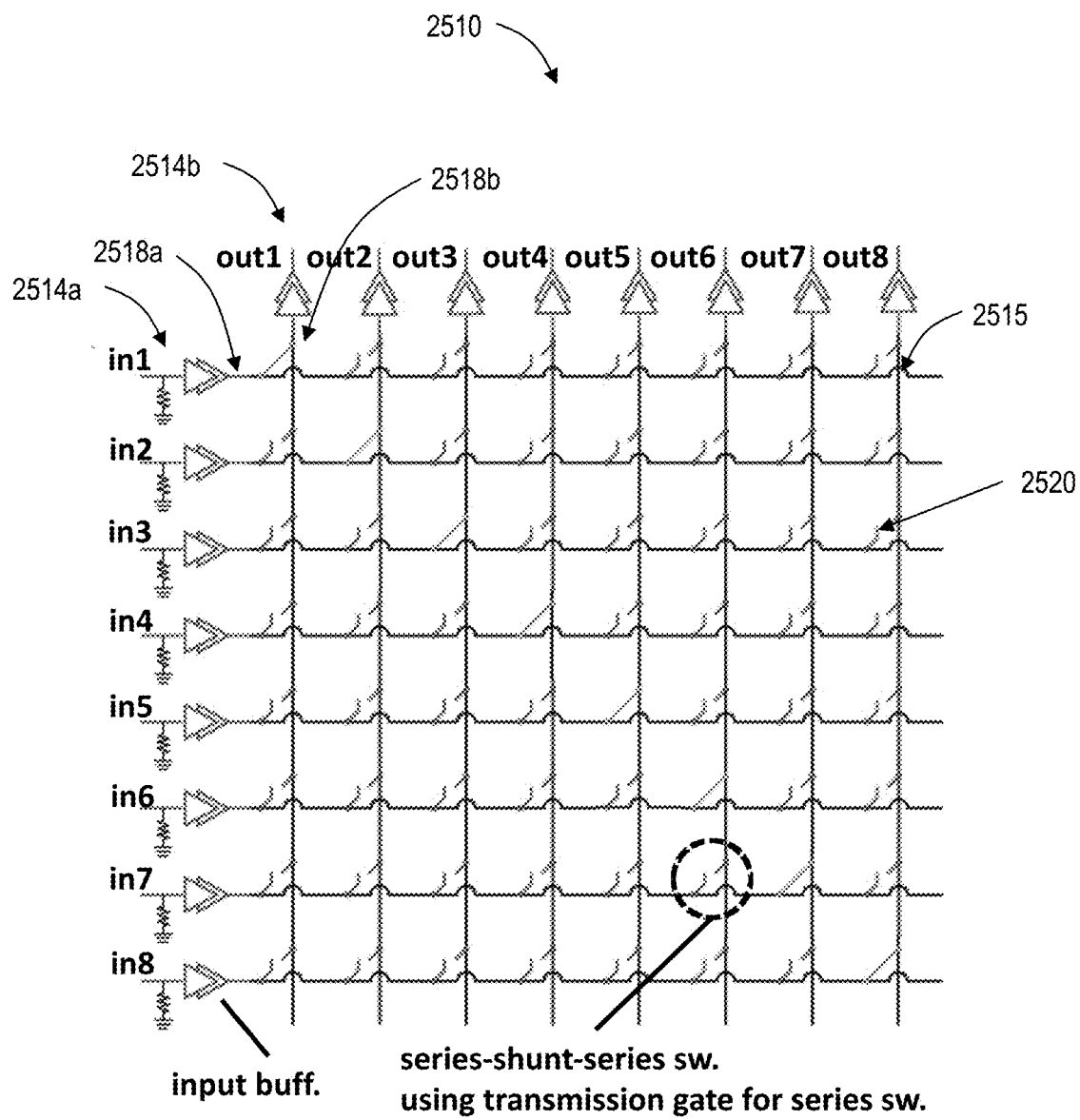
FIG. 22 is a diagram of an 8×8 crosspoint switch.

FIG. 22 is a diagram of an 8×8 crosspoint switch. The crosspoint switch 2510 is connected to 8 input ports 2514a and 8 output ports 2514b. The electrical crosspoint switch 2510 additionally includes a plurality of input traces 2518a connected to each input port 2514a and a plurality of output traces 2518b connected to each output port 2514b. The input ports 2514a and 8 output ports 2514b are adapted to couple to a plurality of fiber bundles (i.e., input fiber bundles and output fiber bundles). The plurality of input ports 2514a and output ports 2514b can be connected via the plurality of intersections 2515 by a plurality of switches 2520. The crosspoint switch 2510 of the present disclosure includes input traces 2518a and output traces 2518b in a vertical and horizontal orientation relative to each other. In various embodiments, each input port 2514a is a photodiode array and each output port 2514b is a micro light emitting diode array. It will be appreciated that other arrangements and numbers of input and output lines and ports are contemplated.

Figure 23:
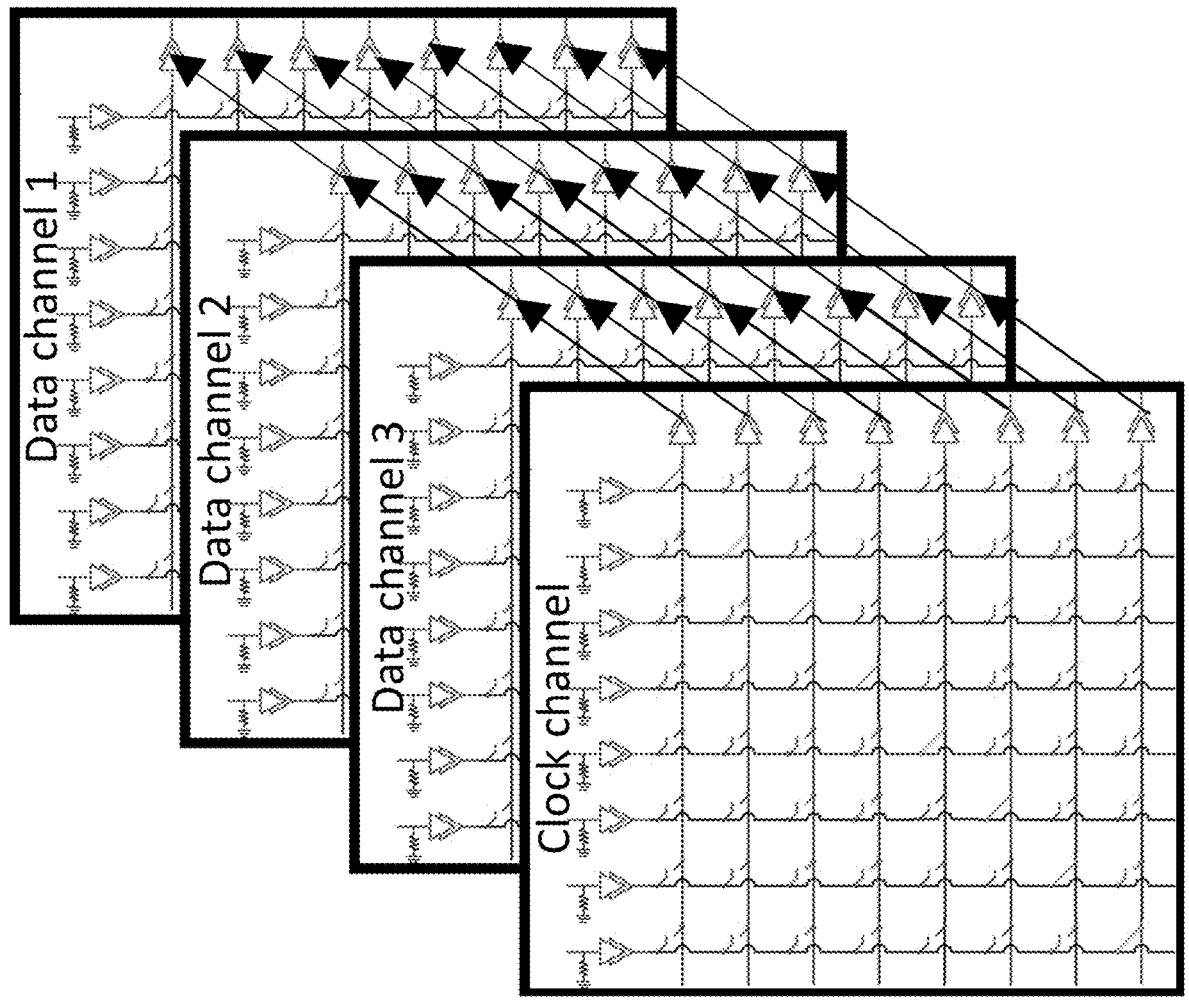
FIG. 23 is a diagram of a layered crosspoint switch approach of the present disclosure.

FIG. 23 is a diagram of a layered electronic crosspoint switch approach of the present disclosure. The present disclosure provides a layered crosspoint approach to simplify control and reduce individual crosspoint size. In the present example, a fiber bundle has 8 distinct ports 2514. Each port 2514 can be switched to an arbitrary output (i.e., 8 input×8 output). However, the data channels and clock forming a port are all switched synchronously to the same port output. The clock is used to retime corresponding data channel output. In embodiments, the plurality of input ports 2514a, the plurality of output ports 2514b, and the electrical crosspoint switch 2510 are copackaged together.

While some examples show a single stage 8×8 Port configuration, a need for a much larger number of cross-connected ports is expected. It is feasible to have 400 fiber bundles (i.e. 20×20 arrangement) coming into a single switch, with each fiber bundle carrying 1600 Gbps of bandwidth in a 16×100 Gbps port arrangement. This is a total of 6400 ports (640 Tbps). Building a 6400 port switch as a single entity is infeasible, but can be done using the multi-stage approach disclosed herein.

The present disclosure provides 32×32 cross points for 10 Gbps signals, which can be modeled as lumped elements. Switch cells are approximately 10×10 micron in 45 nm 12SOI CMOS. Assuming a 32×32 switch, total signal propagation distance between IO buffers is 640 microns. CMOS transmission line in crosspoint has a velocity of 1.7E8 m/s, which corresponds to a 640e-6/1.7E8~4 ps total propagation delay across the crosspoint in a worst case (excluding buffers). 10 Gbps signals have 100 ps bit period, so 4 ps is not significant and a 32×32 crosspoint can be considered as a lumped element.

A large switching fabric can be constructed from smaller, individually buffered, and clocked units. A 32×32 crosspoint will occupy ~320×320 μm2. A 3-stage reconfigurable non-blocking Clos fabric (m=n=32) will occupy ~1 mm×10 mm and provide 1024 channels. In order to accommodate 100 Gbps ports, 11 channels are needed (i.e., a total area of 11 mm×10 mm for 1024 ports). Scaling to 6144×100 Gbps ports, 6 rows and 3 columns for Clos is required (i.e., 66 mm×30 mm of total area, assuming 45 nm 12SOI CMOS).

Current CMOS reticle limits are ~25 mm×30 mm, so several separate chips will have to be integrated using industry-standard multi-chip designs. Total number of unit switches is 19008 units. Assuming each unit switch consumes 20 mW of buffer power, total power is ~400 W. Optical links are expected to consume 1 W/1Tbps. Composite 640Tbps switch optical IO will therefor consume 640 W. Total power consumption is ~1000 W for a 640Tbps switch with optical IO, which is <2 pJ/bit. For comparison, typical 400G-DR4 pluggable modules are ~18 pJ/bit, and low-power CoPackaged Optical (CPO) is pursuing initial designs with ~14 pJ/bit, both without providing any switching functionality.

Using larger unit switches (for example, 80×80 instead of 32×32) affords a substantial reduction in both real estate and power. Each unit switch would occupy 800×800 μm2. A 3 stage Clos switch would be needed (i.e., 11*80*3=2640 unit switches). Switch size is same as before ~66 mm×30 mm with each switch at 50 mW, total power is reduced considerably to ~132 W.

Figure 24:
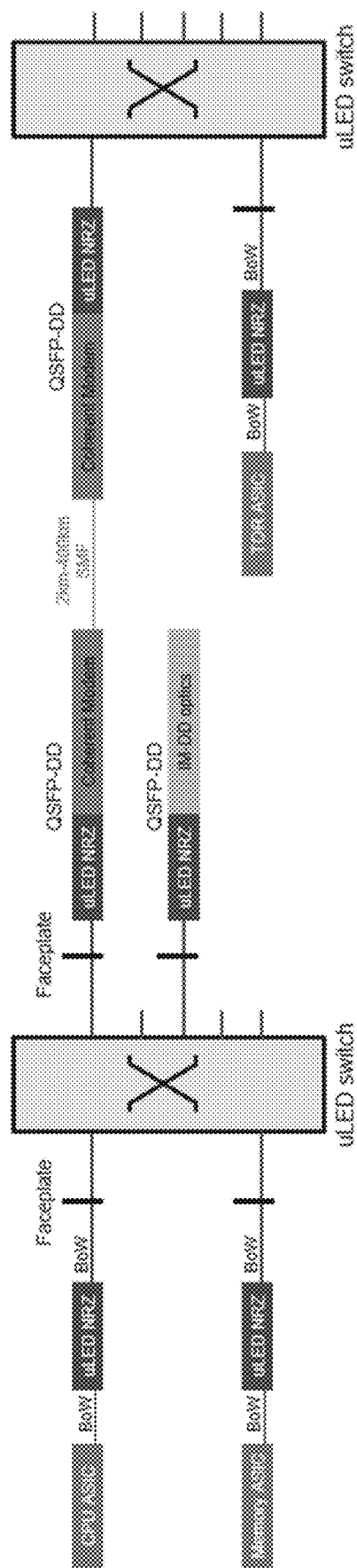
FIG. 24 is a diagram of media conversion via plugs with the optical switch system of the present disclosure.

The present optical switch system can be controlled by an external controller. A method is also proposed that uses a dedicated μLED for addressing, which enables a source-routed switch. Multiple inputs to switch to a single output is blocked by the present embodiment, however, some amount of multi-casting (single input to multiple outputs) is possible with crosspoint designs contemplated in various embodiments. Media conversion with the present optical switch system is achieved by plug personality. For example, converting from short-reach 10 m μLED link to a 400 km coherent line. FIG. 24 is a diagram of media conversion via plugs with the optical switch system of the present disclosure.

In various embodiments, a serialization mode is used. The optical switch system operates on Bunch of Wires (BoW) groups (not individual wires), which are slow and highly parallel buses used to communicate inside chips. By operating at these slow speeds, it allows for very large crosspoint matrices since the resulting stubs don't present signal integrity issues at the slow 4 Gbps speeds. It will be appreciated that other embodiments include other modes (e.g. serialization step ahead of the crosspoint).

Additionally, other embodiments utilize a switching granularity mode. One extreme is crosspoint switching per μLED channel. The other extreme is the system described in the present disclosure (i.e., switching granularity is at the fiber/port level). Also contemplated is sub-group switching granularity. The more granularity, the more control electronics are required within the crosspoint switch. In various embodiments, lasers are utilized instead of μLEDs, and packet-based switching can be used through the addition of more address bits to the dedicated μLED address signal. Further, embodiments can utilize a timeslot guard band clock cycle.

Multiple switch chips can be paralleled to form a larger switch as per standard practices. To enable this, common clock input/output is provided per chip, which allows other chips to phase synchronize. Additionally, a hybrid switch is contemplated for short-reach μLED signals and an OCS for long-reach signals. In the hybrid approach, the plurality of input ports and the plurality of output ports are short reach devices, and further including one or more long reach optical modems connected to one or more of the output ports. The short reach devices can be 10 m modems, and the one or more long reach optical modems can be coherent modems.

A full 3D monolithic integration of the crosspoint switch of the present disclosure is also contemplated, which allows a vertical interconnect that is very short and thus low-capacitance relative to existing 2D tiled structures. Referring back to FIG. 6, a 3D stackup of the μLED switch is represented. The 3D stackup allows μLED arrays 100a to be positioned atop the crosspoint array 634. In various embodiments, the plurality of input ports are in a micro light emitting diode array circuit, the plurality of output ports are in a photodiode array circuit, and the electrical crosspoint switch is in a switch circuit, and the micro light emitting diode array circuit and the photodiode array circuit are stacked on the switch circuit. This reduces overall power and increases switch scale. The regular structure of a crosspoints which lends itself to 3D integration; building tiles of a certain size via manual layout and then replicating those tiles in X, Y and Z directions to achieve the most area efficient crosspoint switch.

The optical switch system of the present disclosure provides a combination of μLED arrays, PDs, imaging fiber bundles, and crosspoint switch on a single chip. A 3D stackup of μLED, PD, and crosspoint array dies results in substantial density and bandwidth increase along with a concentration of multiple imaging fiber bundles on a single chip using an optical taper. Embodiments provide dedicated μLEDs for clock and address, with Clocking and Address shared across several μLED data channels that form a port. Additionally, BoW switching is utilized as opposed to switching serialized signals, and IO is accessible from the surface of the switch rather than its edges.

Photonic Lantern

A traditional photonic lantern provides an efficient way of coupling light from a single large-core multimode fiber to multiple small-core fibers. The small-core fibers (SCF) are typically Single-Mode Fibers (SMFs) but can also be Few-Mode Fibers (FMFs). The important property of a photonic lantern is that they achieve low loss when the number of modes on the Multi-Mode Fiber (MMF) side does not exceed the total number of modes/cores on the SMF side (in case of FMF the number of modes per FMF times total number of FMFs).

Figure 25:
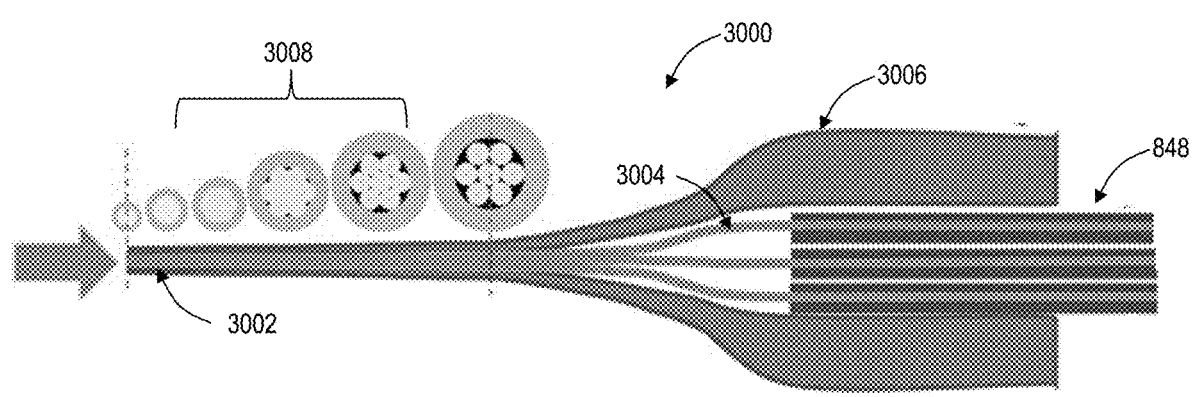
FIG. 25 is a cross section diagram of a photonic lantern.

FIG. 25 is a cross section diagram of a photonic lantern. Again, the traditional photonic lantern 3000 provides an efficient way of coupling light from a MMF 3002 to multiple SCFs 3004. It will be appreciated that in various embodiments, the SCFs 3004 can also be FMFs. Cladding 848 is also disposed between individual SCFs 3004 to reduce crosstalk between the SCFs 3004. Light from an LED, or other light emitting device of the like, enters the photonic lantern 3000 at the MMF 3002 end. The light travels through a transition region 3008 and is split into the individual SCFs 3004.

Typically, photonic lanterns 3000 can be produced by drawing a plurality of SCFs 3004 through a capillary tube 3006 which are fused into a single MMF 3002. Additional methods include Ultrafast Laser Inscription (ULI) using a laser to inscribe waveguides in bulk glass. The capillary tube 3006 forms the cladding of the MMF side of the photonic lantern 3000. As such the numerical aperture of the MMF side can be controlled using an appropriately doped low-index capillary tube.

Known μLED solutions end up with shorter reach or use power-hungry DSP to achieve greater reach and bandwidth. Multi-mode fiber can accept a larger fraction of source optical power due to its larger core and higher Numerical Aperture (NA). Fiber numerical aperture defines optical acceptance angle and also the fibers dependence on refractive indices. Unfortunately, there is a large delay difference between an optical mode that propagates directly along the fiber axis vs mode that "zig-zags" through the fiber (i.e., different modes). From simple geometric approximation, the path difference between these two extreme modes is given as Length*√((NA/n2)2+1)−1. This leads to very fast bandwidth reduction while even a short 10 m length of fiber struggles to support bandwidth in excess of 1 GHz.

In contrast, single-mode fiber does not have any intermodal dispersion by definition, and can support much higher bandwidths over much longer distances, but suffers from poor light collection efficiency. Single-mode chromatic dispersion results from the interplay of two underlying effects, material and waveguide dispersion. Material dispersion occurs from the wavelength dependence of the refractive index. This dependency leads to group delay variation through the group index. The higher the group index, the lesser will be the speed of light signals. Waveguide dispersion is rooted in the wavelength-dependent relationships of the group index to the core diameter and the difference in index between the core and the cladding.

Fiber optic tapers are constructed of imaging fiber that is tapered and shaped. These can perform magnification with lower distortion or more compactness than a lens. They can be bonded to image sensor chips and such. The use of a fiber taper can allow a large μLED array to be condensed down in size. Although, the issue with existing fiber tapers is that they have a 1:1 mapping of cores between both ends, the large end has the same number of cores as the small end. This means that higher order modes are lost as the cores go from large-diameter to small-diameter. This works against the original purpose of intensifying the light. Therefore, an imaging taper would fail to increase communications reach due to optical power losses.

Imaging Lantern

Figure 26:
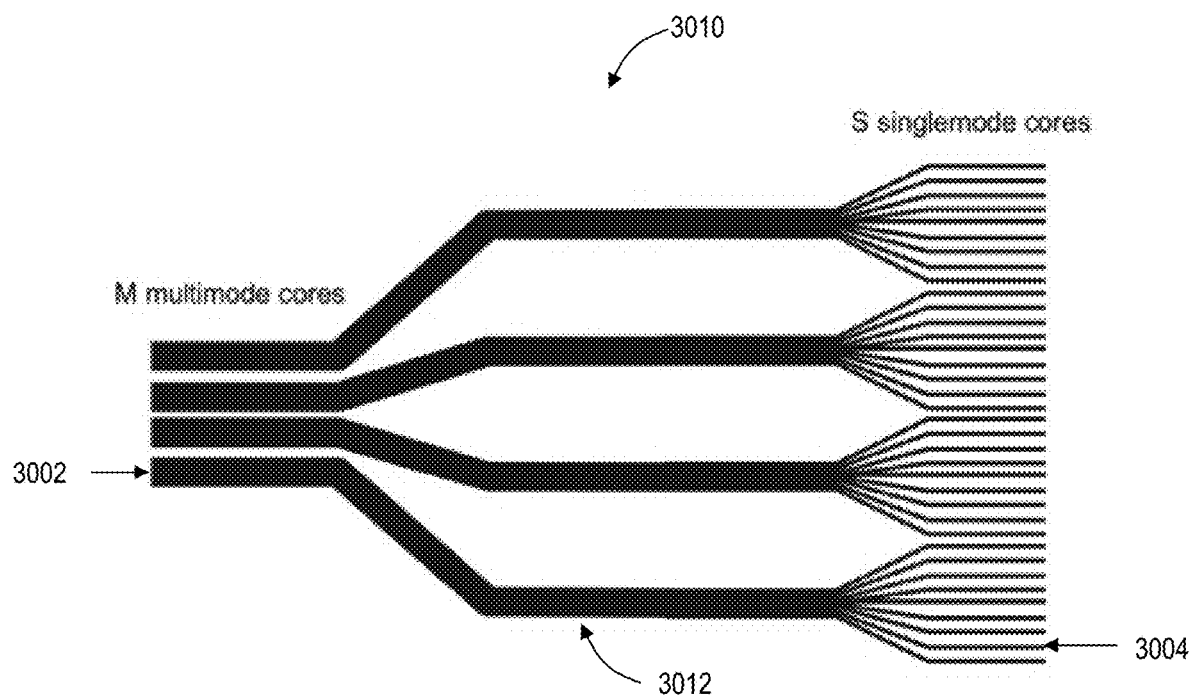
FIG. 26 is a diagram of an imaging lantern including a plurality of multimode fiber (MMF) to small core fiber (SCF) groups.

The present disclosure proposes a new type of MMF to SCF lantern. Various embodiments provide an imaging lantern, where both ends of a given MMF to SCF group maintains its alignment with respect to other MMF to SCF groups in the imaging lantern along the length of the imaging lantern. An imaging lantern can be created in bulk glass through ULI or via bulk grouping of lanterns as glass imaging fiber is manufactured. In the present imaging lantern, there are M cores on the multimode side (MMF side) and S cores on the small-core side (SCF side), where M<S. FIG. 26 is a diagram showing how an imaging lantern 3010 can include a plurality of MMF to SCF groups 3012.

The imaging lantern 3010 of FIG. 26 includes a plurality of MMF to SCF groups (lantern groups) 3012, where a single lantern group 3012 includes a multimode core 3002 transitioning to a plurality of single-mode cores 3004. The imaging lantern thus includes a plurality of multimode cores 3002 (M multimode cores) and a plurality of single-mode cores 3004 (S single-mode cores). In various embodiments, the number of multimode cores 3002 is smaller than the number of single-mode cores 3004 (i.e., M<S). Further, each of the plurality of MMF to SCF groups can include a different number of small cores (single-mode and/or few-mode cores).

In the case that the SCF side (small core side) has a core diameter small enough to be single-mode, the imaging lantern 3010 efficiently transfers μLED light from the MMF side with high efficiency into the plurality of single-mode cores with low transfer loss.

Figure 27:
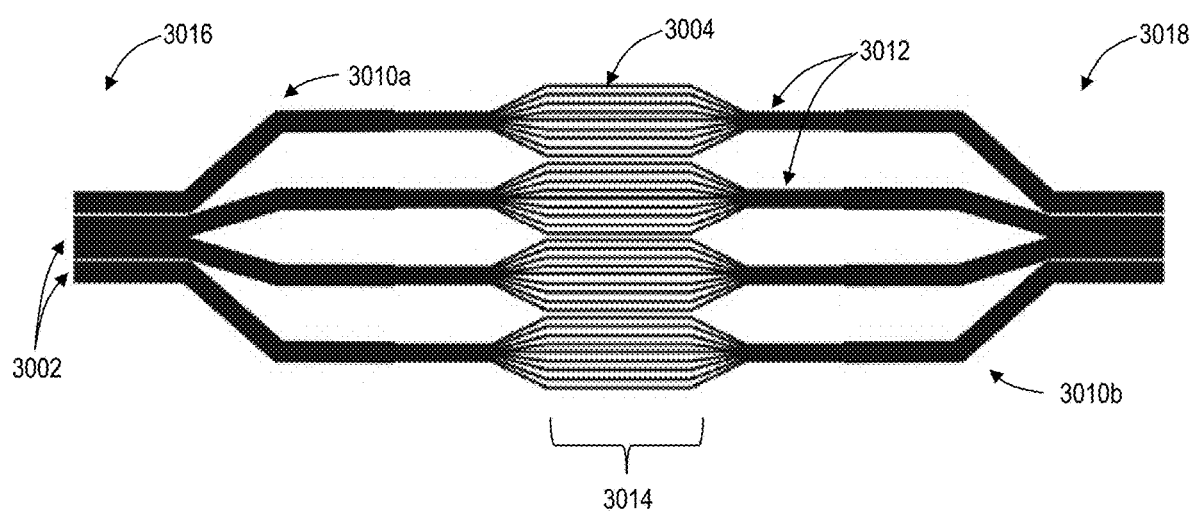
FIG. 27 is a diagram of a fiber cable including a plurality of imaging lanterns.

FIG. 27 is a diagram of imaging lanterns (3010a, 3010b) at both ends of a fiber cable 3014 with omission of cladding. In various embodiments, the fiber cable 3014 includes a plurality of single-mode cores 3004, belonging to a plurality of lantern groups 3012. The fiber cable 3014 can further include an input end 3016 and an output end 3018. The imaging lantern 3010a at the input end 3016 transforms multimode light into a plurality of single modes for propagation through a prescribed distance via the fiber cable 3014 (i.e., tens of meters or more). At the output end 3018 of the fiber cable 3014, a transition from single modes to multimode light takes place via a second imaging lantern 3010b. This allows the imaging lantern 3010 to utilize the capabilities of both the multimode cores 3002 and the single-mode cores 3004. High light coupling efficiency and transmission occurs through the multimode cores 3002 without transfer loss, while light can travel longer distances without modal dispersion through the single-mode cores 3004 of the fiber cable 3014.

It will be appreciated that the imaging lanterns (3010a, 3010b) and the fiber cable 3014 of FIG. 27 are not drawn to scale. The imaging lanterns (3010a, 3010b) are enlarged to show detail, and the fiber cable 3014 is shortened to provide a more concise diagram. In various embodiments, the imaging lanterns (3010a, 3010b) are centimeters in scale, while the fiber cable can be tens or hundreds of meters in length.

Since transmission over long distance is done in single-mode or few-mode cores (small cores) 3004 in the fiber cable 3014, the multimode cores 3002 can be produced with a large diameter. This can be done without concern of increasing the number of modes which would normally cause large modal dispersion if the transmission at long distance was done without the imaging lantern 3010 of the present disclosure. The large multimode cores 3002 allow a larger element count μLED array with groups of μLEDs (driven by the same signal) to increase optical source power and thus increase loss-limited reach (not just dispersion-limited bandwidth). Such μLED arrays can be contemplated as the various LED and PD arrangements disclosed in forgoing sections of the present disclosure. In various embodiments, imaging lanterns 3010 can be utilized at the input and output ends of a fiber cable (i.e., FIG. 27) to transmit signals from an array of LEDs to an array of PDs as described herein.

Note that various embodiments do not have to maintain an "imaging" property within a single lantern group 3012, since all cores within a single lantern group 3012 are expected to carry the same signal. In summary, the present invention improves loss-limited bandwidth by enabling light source intensification and light coupling efficiency, in addition to improving modal-dispersion-limited bandwidth by using single-mode fibers 3004. The imaging lantern 3010 can be produced as a single cable (i.e., for an Active Optical Cable (AOC)) with each end having multimode cores 3002 and the middle being composed of single-mode cores 3004, as shown in FIG. 27. In such embodiments, there are no alignment issues associated with the single-mode cores 3004.

The construction of the imaging lantern 3010 can be from glass cores or plastic cores. Additionally, embodiments include step-index, graded-index, or trench profiles in imaging lanterns, as well as 400 nm-1550 nm wavelengths. Further, crosstalk is not an issue with the single-mode side of the imaging lantern 3010 at short reaches (i.e., <100 m).

All of the single-mode cores 3004 of a single lantern group 3012 carry the same communications signal. As such, crosstalk between single-mode cores 3004 within a single lantern group 3012 is not a concern, which allows single-mode cladding diameter to be reduced and thus cable size to be smaller. This is especially true when broadband incoherent light sources such as μLEDs are used, which prevents coherent interference. Nonetheless, embodiments include the option of larger cladding distance between single-mode cores 3004 in adjacent lantern groups 3012 than between single-mode cores 3004 within a single lantern group 3012. Various embodiments can also include a mixture of different single-mode core sizes in the construction of the lantern groups 3012 and imaging lantern 3010, to further reduce crosstalk. The present invention is applicable to any optical system that uses high numerical aperture optical sources. Embodiments of the present imaging lantern 3010 contemplate use with µLED optical sources, but it will be appreciated that other sources such as Vertical-Cavity Surface-Emitting Laser (VCSEL) based sources are also contemplated.

As mentioned previously, various embodiments target application uses µLED as broadband incoherent light sources. These are coupled to large-core, large-NA multi-mode ends of lantern groups such that optical coupling loss is minimized. The lantern groups map modes into separate transmission cores (from multimode to single or few-mode fiber) such that optical power is preserved while modal dispersion of the optical link is substantially reduced. This increases mode-dispersion-limited optical link bandwidth. The few-mode fiber end can be imaged onto a large photodetector or several smaller ones, combining photocurrents into a single Trans-Impedance Amplifier (TIA) for amplification and data detection. As all few-mode cores carry the same optical incoherent signal, systems can tolerate large optical crosstalk allowing embodiments of the imaging lantern to have reduced cladding isolation between the cores in lantern groups.

It is also noted that system applications of the imaging lantern may be single-side or two-sided. It is anticipated that an imaging lantern will be required on the optical source (µLED or VCSEL) side of an optical link. However, receivers may be coupled as many photodetector elements to the single or few-mode fiber bundle. Alternatively, another imaging lantern may be implemented, such that larger photodetector(s) are coupled to the multi-mode fiber. The trade-offs are present in the relative cost and complexity of imaging lantern construction vs. multi-element photodetectors with associated amplifying and combining electronic circuitry.

The target application of the present imaging lantern is for use with blue µLEDs (~420 nm), requiring fibers that have good UV/Visible transmission characteristics. Some possibilities are Fluoride Glass Optical Fiber including Zirconium Fluoride (ZrF4) and Indium Fluoride (InF3) fibers. Specialty Silicone (Si) glass fibers with operation down to ~300 nm are also contemplated.

In an exemplary embodiment, a fiber cable 3014 includes a plurality of cores and one or more imaging lanterns 3010. The cable includes a first end and a second end, and each end of the cable includes an imaging lantern 3010, such as the cable depicted in FIG. 27. The cable can have a length of 10 m or greater due to the use of single-mode cores 3004. The imaging lantern 3010a at the first end of the cable 3014 is adapted to receive signals via its M multimode cores 3002 and transmit the signals via its S single-mode cores 3004 through the cable 3014, wherein the imaging lantern 3010b at the second end of the cable is adapted to receive the signals via its S single-mode cores 3004 and transmit the signals through its M multimode cores 3002.

Various embodiments of the fiber cable including the imaging lanterns (FIG. 27) are adapted, as to allow the imaging lantern 3010a at the first end of the cable 3014 to receive signals from one or more Micro Light Emitting Diodes (µLEDs). The imaging lantern 3010b at the second end of the cable can be adapted to transmit the signals to one or more photodetectors. For optimal transmission, the total number of modes received at the first end is equal to the total number of cores in the cable.

Imaging Lantern Manufacturing

Figure 28A:
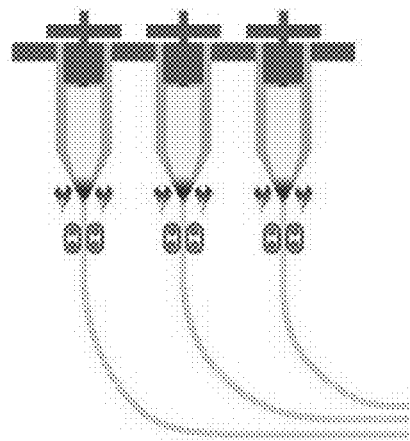
FIG. 28A—FIG. 28C show manufacturing techniques of lantern groups.
Figure 28B:
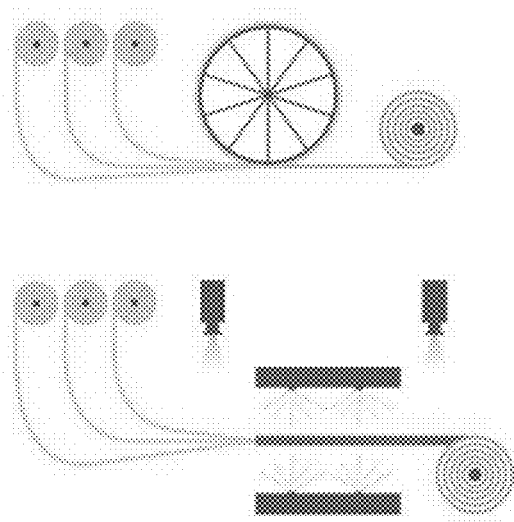
Figure 28C:
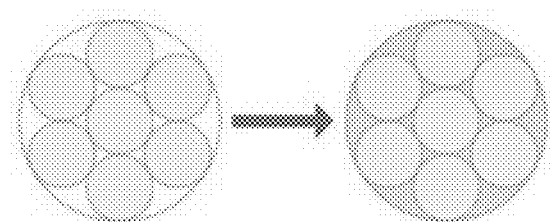
Figure 28C:
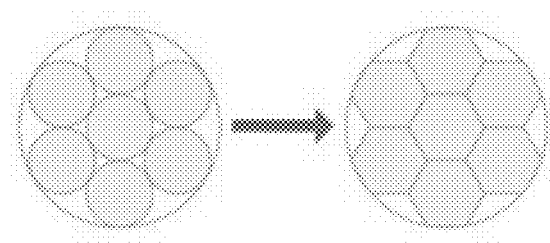

Various embodiments of the present disclosure include manufacturing techniques of imaging lanterns. Imaging fiber is produced by a large pre-form of large-diameter rods stacked in an ordered hexagonal pattern. The pre-form is heated and drawn down to a small size. Such techniques include fiber drawing, precision bundling and extrusion, and end termination shown respectively in FIG. 28A, FIG. 28B, and FIG. 28C.

Fiber drawing (FIG. 28A) includes heating a glass rod at an end to fuse a core and cladding together before drawing the fiber down to a desired diameter. For image conductors, this process can be repeated with a plurality of fibers collected and drawn together. Precision bundling and extrusion (FIG. 28B) begins with a plurality of bundles which are gathered to form a final fiber bundle. These bundles can be arranged in randomized patterns or specific patterns. The final fiber bundle can then be sheathed with a polymer or other suitable material, and extruded to form a cable of any length. End termination (FIG. 28C) can include a particular gluing or fusing process to fix the fiber bundles in the sheathes. Hot fusing includes softening the ends of the fiber bundle and compressing the ends under heat to eliminate the space between individual fibers and reduce the total diameter of the fiber bundle.

Based on elements of these techniques, various processes of producing the imaging lantern of the present disclosure start with a pre-form of a plurality of rods (for example, 18,000 rods) grouped into bundles (for example, 3600 bundles). Further, processes include drawing down all of the bundles together and fusing the rods within each bundle (but not fusing one bundle to another bundle). This results in a new pre-form of a plurality of multimode cores. The space between the multimode cores is filled with low-index material and draw down further and fused at an end. The process is repeated on the multimode cores at desired lengths while the single-mode fibers are still attached to the pre-form. The result is a cable of desired length with a plurality of multimode cores (for example, 3600 multimode cores) at each end, and a plurality of single-mode or few-mode fibers (small cores) in between (for example, 18000 single-mode or few-mode fibers in between each group of multimode cores) arranged as a cable with an Imaging Lantem at each end.

For back-to-back imaging lanterns, one can start with an imaging bundle of single-mode fibers. Then one can put each end of that bundle through the processes described above to form an imaging lantern at each end. The result is a back-to-back imaging lantern (as shown in FIG. 27) without the need for a separate step to couple single-mode fibers to each other.

Other Applications

For networking applications, the imaging fiber bundle has been described with reference to LED or micro-LED inputs. Other applications can use any multimode light source. For example, the light source might be the night sky in a telescope application, reflected light in a camera application, etc. That is the Imaging fiber bundle contemplates other use cases as well as networking, and the multimode light source is one of but not limited to an array of Micro Light Emitting Diodes (µLED), reflected light from an object, and night sky.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. An imaging fiber bundle comprising:
    a first end and a second end of a fiber cable, wherein each of the first end and the second end include N multimode cores, N>1; and
    N photonic lantern groups within the fiber cable, wherein the N photonic lantern groups are disposed between and aligned to the N multimode cores at each of the first end and the second end thereby forming back-to-back N photonic lanterns between corresponding N multimode cores at the first end and the second end,
    wherein the N photonic lantern groups include few-mode cores.

2. The imaging fiber bundle of claim 1, wherein at least one of the N photonic lanterns includes
    a multimode core, at the first end, that extends to S single-mode cores, where S is an integer, and S>1.

3. The imaging fiber bundle of claim 1, wherein at least one of the N photonic lantern groups includes
    a multimode core, at the first end, that extends to S few-mode cores to another multimode core, at the second end, where S is an integer, and S>1.

4. The imaging fiber bundle of claim 1, further comprising cladding, wherein larger cladding is utilized between small core fibers of adjacent lantern groups of the N photonic lantern group than between small core fibers within a single lantern group.

5. The imaging fiber bundle of claim 1, wherein the first end is adapted to receive signals from an array of Micro Light Emitting Diodes (µLEDs), and wherein the second end is adapted to transmit signals to one or more photodetectors.

6. The imaging fiber bundle of claim 1, wherein a total number of modes excited at the first end is not exceeding the total number of small core fibers in the N photonic lantern groups.

7. The imaging fiber bundle of claim 1, wherein the N photonic lantern groups include one of Zirconium Fluoride (ZrF4) fibers, Indium Fluoride (InF3) fibers, and Silicon (Si) glass fibers.

8. The imaging fiber bundle of claim 1, wherein the imaging fiber bundle has a length of 10 m or more.

9. An imaging fiber bundle comprising:
    a first end and a second end of a fiber cable, wherein each of the first end and the second end include N multimode cores, N>1; and
    N photonic lantern groups within the fiber cable, wherein the N photonic lantern groups are disposed between and aligned to the N multimode cores at each of the first end and the second end thereby forming back-to-back N photonic lanterns between corresponding N multimode cores at the first end and the second end,
    wherein at least one of the N photonic lantern groups includes a multimode core, at the first end, that extends to S few-mode cores to another multimode core, at the second end, where S is an integer, and S>1.

10. The imaging fiber bundle of claim 9, wherein the first end is adapted to receive signals from an array of Micro Light Emitting Diodes (µLEDs), and wherein the second end is adapted to transmit signals to one or more photodetectors.

11. The imaging fiber bundle of claim 9, wherein a total number of modes excited at the first end is not exceeding the total number of small core fibers in the N photonic lantern groups.

12. The imaging fiber bundle of claim 9, wherein the N photonic lantern groups include one of Zirconium Fluoride (ZrF4) fibers, Indium Fluoride (InF3) fibers, and Silicon (Si) glass fibers.

13. The imaging fiber bundle of claim 9, wherein the imaging fiber bundle has a length of 10 m or more.

14. An imaging fiber bundle comprising:
    a first end and a second end of a fiber cable, wherein each of the first end and the second end include N multimode cores, N>1;
    N photonic lantern groups within the fiber cable, wherein the N photonic lantern groups are disposed between and aligned to the N multimode cores at each of the first end and the second end thereby forming back-to-back N photonic lanterns between corresponding N multimode cores at the first end and the second end; and cladding, wherein larger cladding is utilized between small core fibers of adjacent lantern groups of the N photonic lantern group than between small core fibers within a single lantern group.

15. The imaging fiber bundle of claim 14, wherein at least one of the N photonic lanterns includes
a multimode core, at the first end, that extends to S single-mode cores, where S is an integer, and S>1.

16. The imaging fiber bundle of claim 14, wherein the first end is adapted to receive signals from an array of Micro Light Emitting Diodes (μLEDs), and wherein the second end is adapted to transmit signals to one or more photodetectors.

17. The imaging fiber bundle of claim 14, wherein a total number of modes excited at the first end is not exceeding the total number of small core fibers in the N photonic lantern groups.

18. The imaging fiber bundle of claim 14, wherein the N photonic lantern groups include one of Zirconium Fluoride (ZrF4) fibers, Indium Fluoride (InF3) fibers, and Silicon (Si) glass fibers.

19. The imaging fiber bundle of claim 14, wherein the imaging fiber bundle has a length of 10 m or more.

* * * * *